United States Patent

Ohmae et al.

[11] Patent Number: 5,483,451
[45] Date of Patent: Jan. 9, 1996

[54] START CONTROL DEVICE FOR VEHICLE PASSENGER PROTECTING DEVICE

[75] Inventors: Katsuhiko Ohmae; Yukihiro Okimoto; Takashi Furui, all of Hyogo, Japan

[73] Assignees: Mitsubishi Denki Kabushiki Kaisha; Mitsubishi Jidosha Kogyo Kabushiki Kaisha, both of Tokyo, Japan

[21] Appl. No.: 447,923

[22] Filed: May 23, 1995

Related U.S. Application Data

[63] Continuation of Ser. No. 179,695, Jan. 11, 1994, abandoned.

[30] Foreign Application Priority Data

Apr. 20, 1993 [JP] Japan .................................. 5-093132

[51] Int. Cl.⁶ .................................................. B60R 21/32
[52] U.S. Cl. .................. 364/424.05; 340/669; 307/10.1; 280/734; 280/735; 180/282
[58] Field of Search ...................... 364/424.05; 340/436, 340/669; 307/10.1; 280/734, 735; 180/274, 282

[56] References Cited

U.S. PATENT DOCUMENTS

| | | | |
|---|---|---|---|
| 5,021,678 | 6/1991 | Diller | 307/10.1 |
| 5,067,745 | 11/1991 | Yoshikawa | 280/735 |
| 5,068,793 | 11/1991 | Condne et al. | 364/424.05 |
| 5,189,311 | 2/1993 | Moriyama et al. | 307/10.1 |
| 5,225,985 | 7/1993 | Okano | 364/424.05 |
| 5,229,943 | 7/1993 | Eigler et al. | 364/424.05 |
| 5,262,949 | 11/1993 | Okano et al. | 364/424.05 |
| 5,285,187 | 2/1994 | Hirao et al. | 340/436 |
| 5,382,049 | 1/1995 | Hiramitsu et al. | 280/735 |

FOREIGN PATENT DOCUMENTS

| | | |
|---|---|---|
| 3816590A1 | 11/1989 | Germany . |
| 4223562A1 | 9/1993 | Germany . |
| 59-8574 | 2/1984 | Japan . |
| 3243445 | 10/1991 | Japan . |

*Primary Examiner*—Vincent N. Trans
*Assistant Examiner*—Tyrone V. Walker

[57] ABSTRACT

Disclosed herein is a start control device for starting a vehicle passenger protecting device such as an air bag, which does not respond to an impact against which the vehicle passenger protecting device must not be started, but quickly responds to a collision against which the vehicle passenger protecting device must be started. The start control device includes a start level generator for setting a decision level of start signal generation to a higher level for a predetermined time from a rise timing of an acceleration signal obtained from an acceleration sensor in deciding a collision by using an integral value of the acceleration signal. With this arrangement, in case of the impact against which the vehicle passenger protecting device must not be started, the start signal can be prevented from being generated.

24 Claims, 20 Drawing Sheets

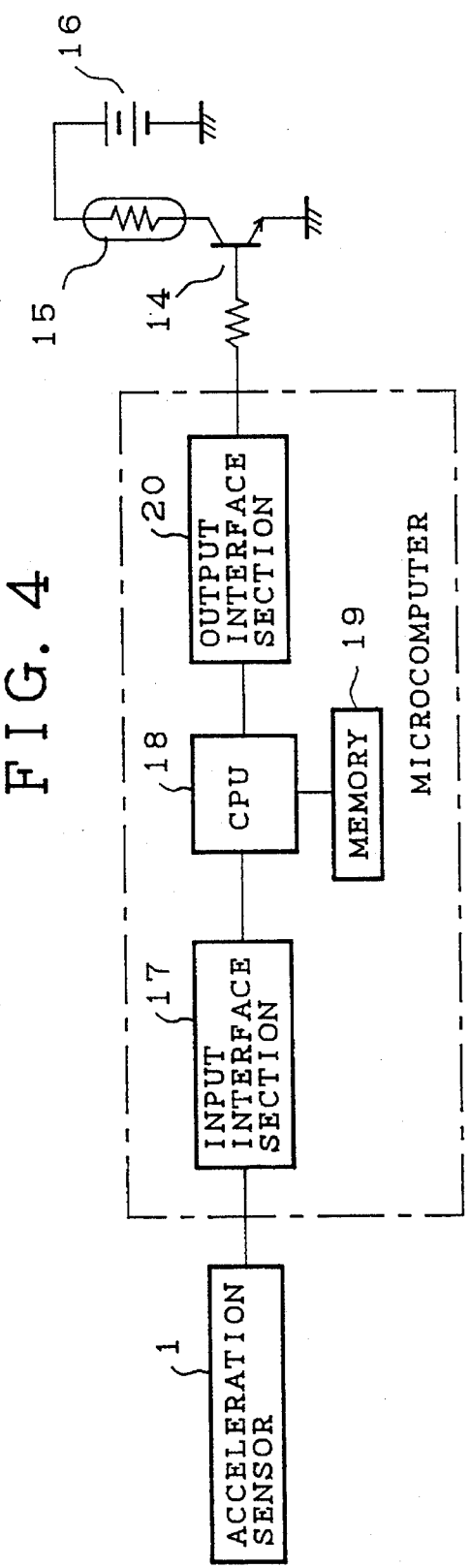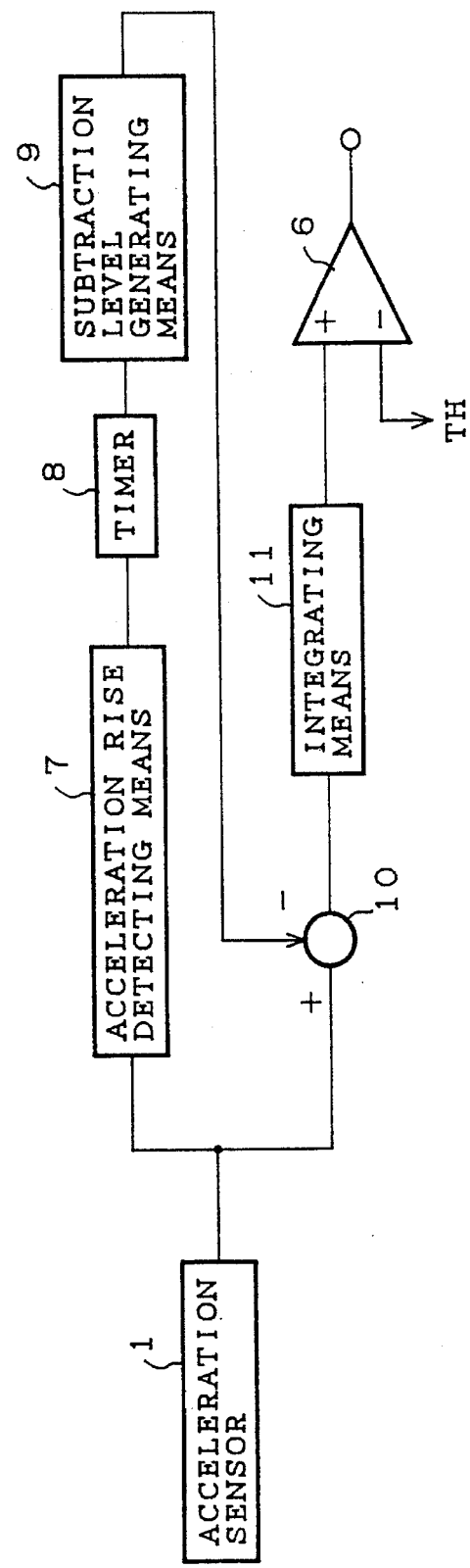

FIG.8(a)
OUTPUT WAVEFORM FROM ACCELERATION SENSOR 1
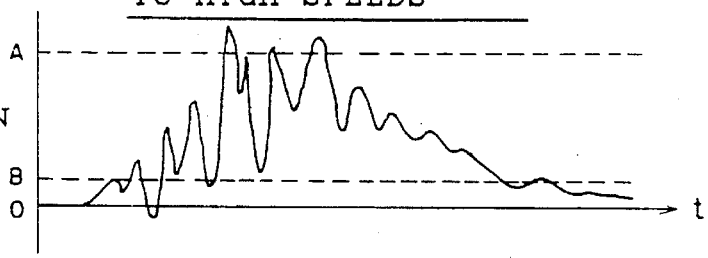
FIG.8(b)
OUTPUT WAVEFORM FROM INTEGRAL PROCESSING SECTION 22
FIG.8(c)
OUTPUT WAVEFORM FROM COMPARATOR 23
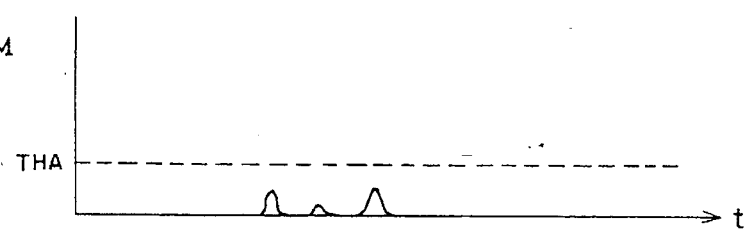
FIG.8(d)
OUTPUT WAVEFORM FROM TIMER 3
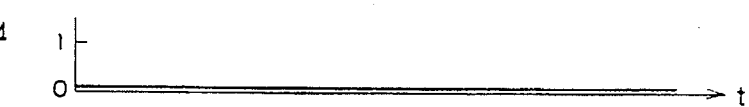
FIG.8(j)
OUTPUT WAVEFORM FROM INTEGRAL PROCESSING SECTION 52
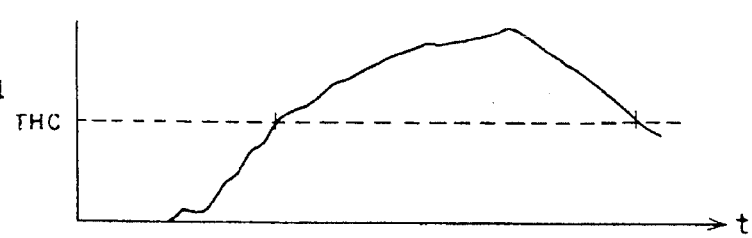
FIG.8(k)
OUTPUT WAVEFORM FROM COMPARATOR 6
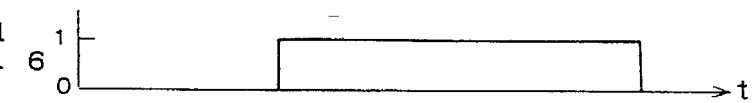

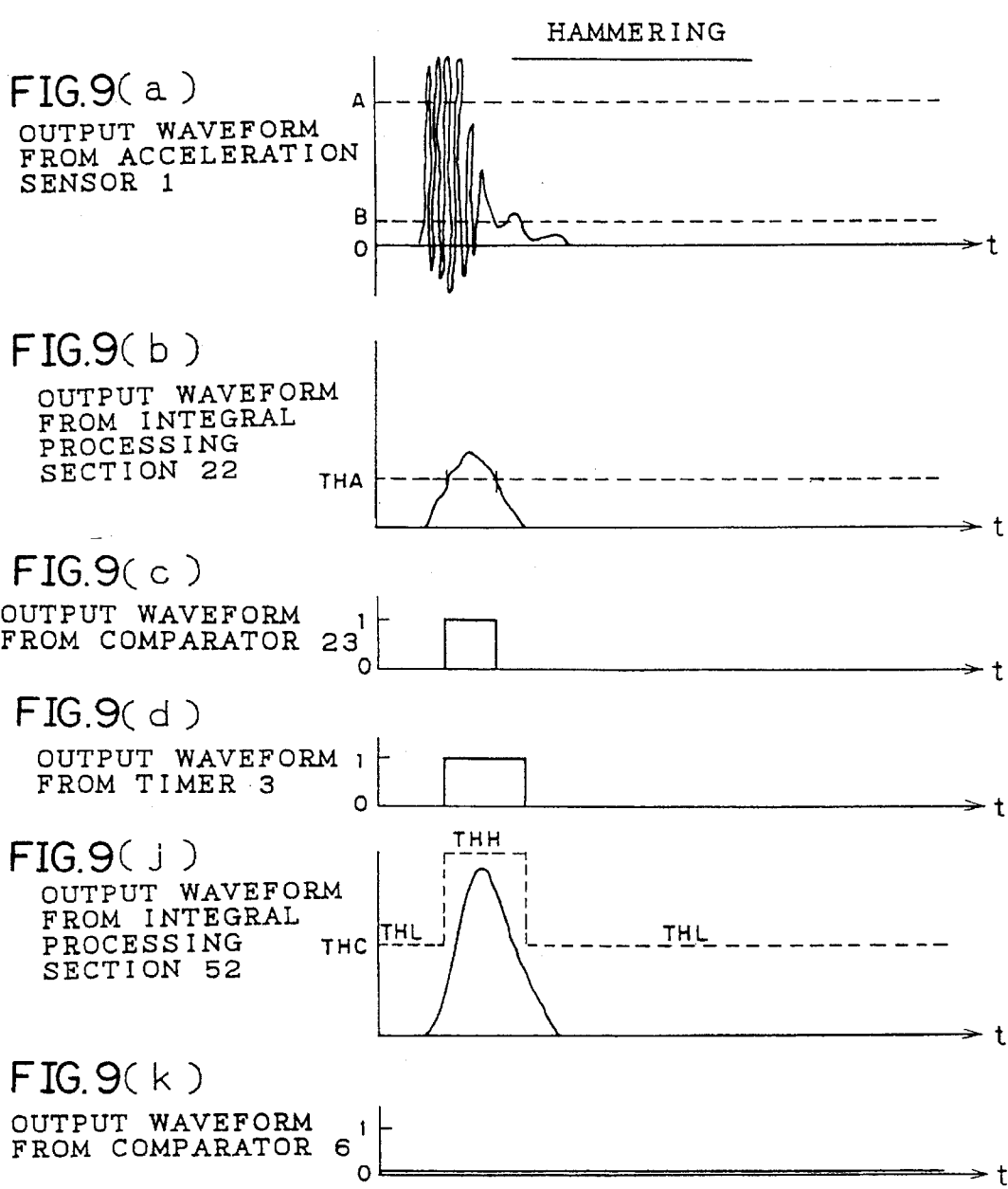

FIG.15(a)
OUTPUT WAVEFORM
FROM ACCELERATION
SENSOR 1
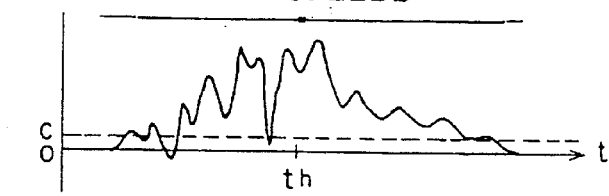
FIG.15(e)
OUTPUT WAVEFORM
FROM INTEGRAL
PROCESSING
SECTION 72
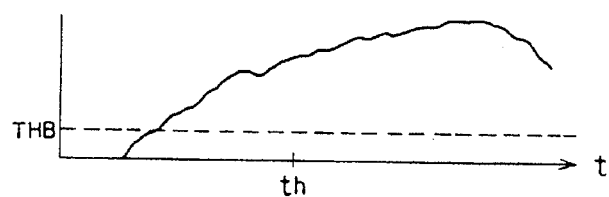
FIG.15(f)
OUTPUT WAVEFORM
FROM COMPARATOR 73
FIG.15(g)
OUTPUT WAVEFORM
FROM INVERTER 91
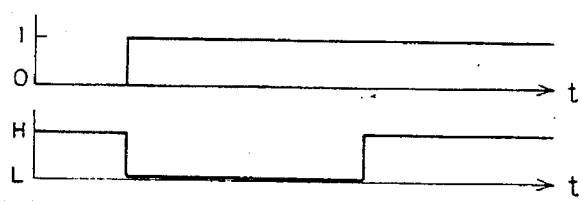
FIG.15(h)
OUTPUT WAVEFORM
FROM RAMP FUNCTION
GENERATOR 92
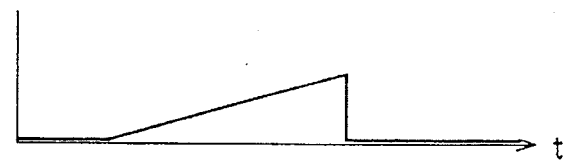
FIG.15(i)
OUTPUT WAVEFORM
FROM ADDER 93
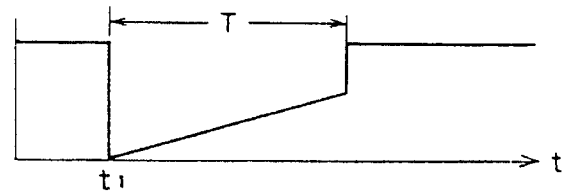
FIG.15(j)
OUTPUT WAVEFORM
FROM INTEGRATING
MEANS 11
FIG.15(k)
OUTPUT WAVEFORM
FROM COMPARATOR 6
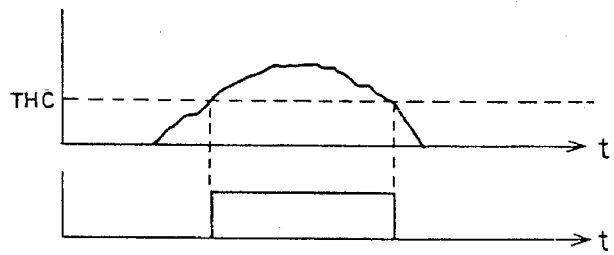

COLLISION AT LOW SPEEDS
FIG. 17(a)
OUTPUT WAVEFORM FROM ACCELERATION SENSOR 1
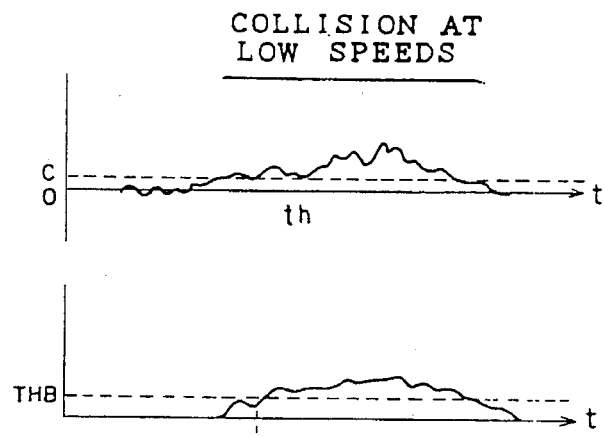
FIG. 17(e)
OUTPUT WAVEFORM FROM INTEGRAL PROCESSING SECTION 72
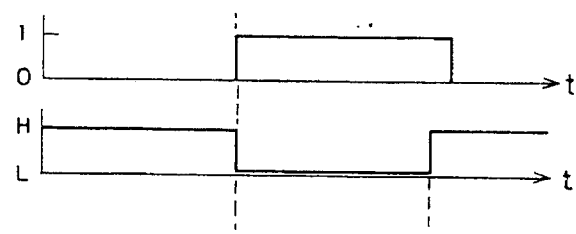
FIG. 17(f)
OUTPUT WAVEFORM FROM COMPARATOR 73
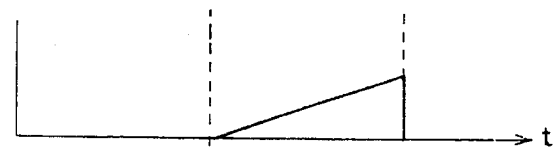
FIG. 17(g)
OUTPUT WAVEFORM FROM INVERTER 91
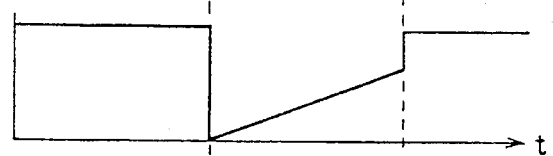
FIG. 17(h)
OUTPUT WAVEFORM FROM RAMP FUNCTION GENERATOR 92
FIG. 17(i)
OUTPUT WAVEFORM FROM ADDER 93
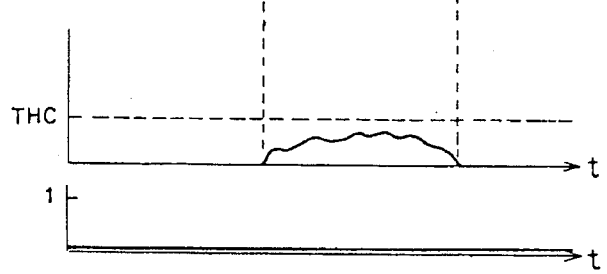
FIG. 17(j)
OUTPUT WAVEFORM FROM INTEGRATING MEANS 11
FIG. 17(k)
OUTPUT WAVEFORM FROM COMPARATOR 6
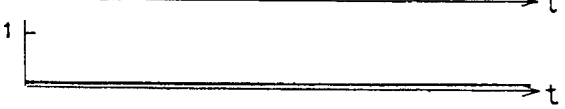

FIG.20(a)
OUTPUT WAVEFORM
FROM ACCELERATION
SENSOR 1

COLLISION AT MEDIUM TO HIGH SPEEDS

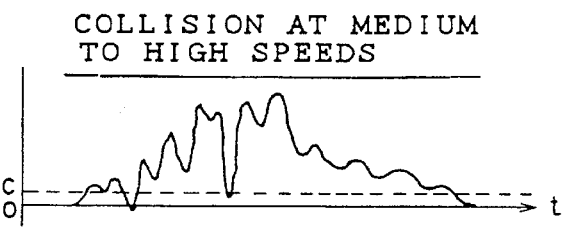

FIG.20(e)
OUTPUT WAVEFORM
FROM INTEGRAL
PROCESSING
SECTION 72

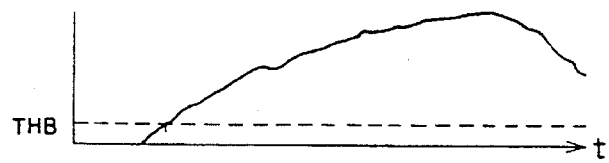

FIG.20(f)
OUTPUT WAVEFORM
FROM COMPARATOR 73

FIG.20(ℓ)
OUTPUT WAVEFORM
FROM DELAY TIMER 12

FIG.20(g)
OUTPUT WAVEFORM
FROM INVERTER 91

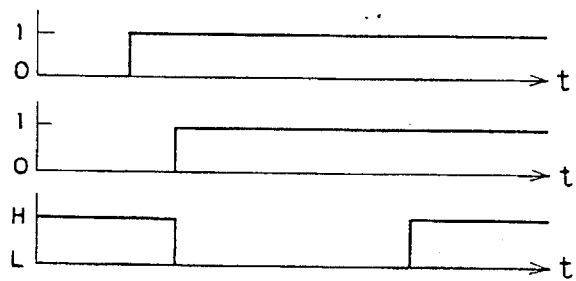

FIG.20(h)
OUTPUT WAVEFORM
FROM RAMP FUNCTION
GENERATOR 92

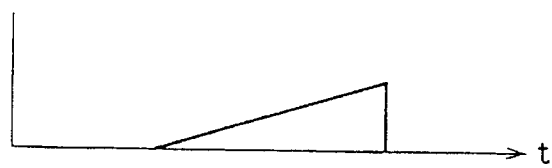

FIG.20(i)
OUTPUT WAVEFORM
FROM ADDER 93

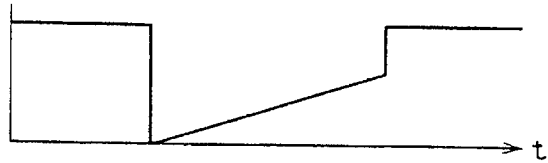

FIG.20(j)
OUTPUT WAVEFORM
FROM INTEGRATING
MEANS 11

FIG.20(k)
OUTPUT WAVEFORM
FROM COMPARATOR 6

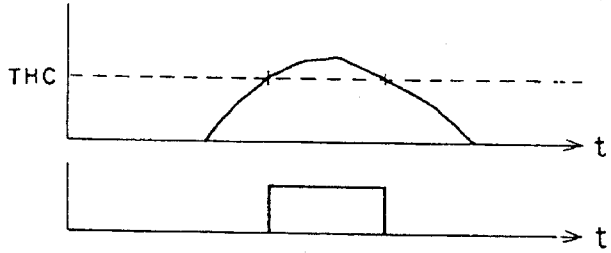
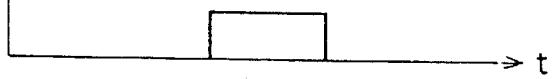

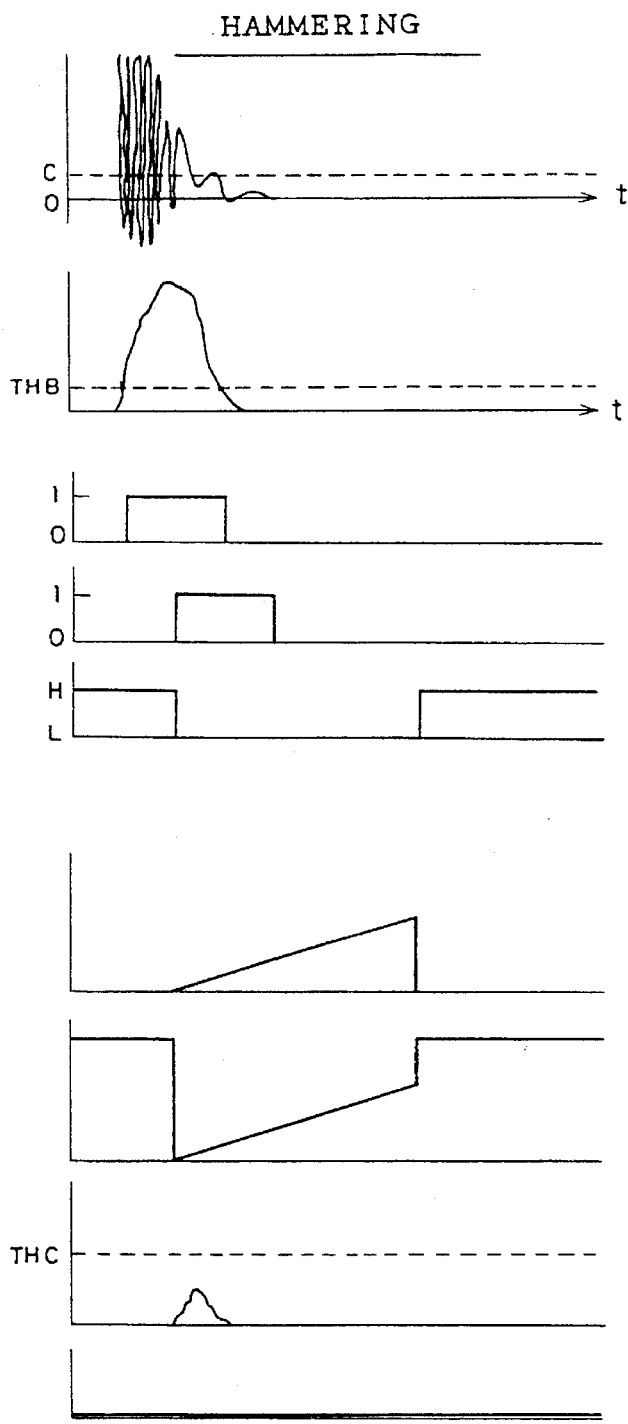

FIG. 21(a) OUTPUT WAVEFORM FROM ACCELERATION SENSOR 1

FIG. 21(e) OUTPUT WAVEFORM FROM INTEGRAL PROCESSING SECTION 72

FIG. 21(f) OUTPUT WAVEFORM FROM COMPARATOR 73

FIG. 21(ℓ) OUTPUT WAVEFORM FROM DELAY TIMER 12

FIG. 21(g) OUTPUT WAVEFORM FROM INVERTER 91

FIG. 21(h) OUTPUT WAVEFORM FROM RAMP FUNCTION GENERATOR 92

FIG. 21(i) OUTPUT WAVEFORM FROM ADDER 93

FIG. 21(j) OUTPUT WAVEFORM FROM INTEGRATING MEANS 11

FIG. 21(k) OUTPUT WAVEFORM FROM COMPARATOR 6

START CONTROL DEVICE FOR VEHICLE PASSENGER PROTECTING DEVICE

This application is a continuation of application Ser. No. 08/179,695, filed on Jan. 11, 1994, now abandoned.

BACKGROUND OF THE INVENTION

1. Field of the Invention

The present invention relates to a start control device for starting a vehicle passenger protecting device such as an air bag or a seat belt pretensioner, adapted to detect the collision of a vehicle and operate.

2. Description of the Prior Art

FIG. 1 is a circuit diagram of a conventional air bag start control device described in Japanese Patent Publication No. 59-8574, for example. Referring to FIG. 1, reference numeral 1 denotes an acceleration sensor (G sensor) for converting an acceleration due to an impact against a vehicle into an electrical acceleration signal (which will be hereinafter referred to as an acceleration signal) and outputting the acceleration signal; 101 denotes an integrating circuit for integrating the acceleration signal from the acceleration sensor 1; 102 and 105 denote comparators for comparing the output from the integrating circuit 101 with comparative values V1 and V2, respectively; 103 denotes a time constant circuit consisting of a resistor R2, a capacitor C2, and a diode D2, for receiving the output from the comparator 102; 104 denotes a comparator for comparing the output from the time constant circuit 103 with the output from the integrating circuit 101; 106 denotes an oscillator for oscillating a reset pulse according to the output from the comparator 105; and 107 denotes a differentiating circuit consisting of a capacitor C1 and a resistor R1, for differentiating the output from the oscillator 106 and supplying an output signal as a reset signal through a diode D1 to the integrating circuit 101.

An air bag must be started according to an acceleration generating upon collision of a vehicle, for example. However, if a start signal for starting the air bag is generated according to an acceleration signal only, the start signal would be undesirably generated in the case where a small object as hardly damaging a vehicle body attacks in the vicinity of the acceleration sensor at high speeds. In such a case, a very large acceleration with a short duration is generated. For example, such a very large acceleration is generated when an impact is applied with use of a hammer in the vicinity of the acceleration sensor. In such a case of the impact due to hammering, the start control device must not be operated. If the start control device is operated in response to hammering, there is a possibility that a very dangerous situation may occur. Thus, it is necessary to prevent that the start control device is operated against the impact causing a very large acceleration with a short duration.

To cope with this problem, the above-mentioned prior art device is designed to integrate the acceleration signal for a given time and thereby smoothen the acceleration signal. That is, the integrating circuit 101 integrates the acceleration signal from the acceleration sensor 1 to convert the acceleration signal into a velocity signal. The integrating circuit 101 is reset at fixed intervals by the reset signal from the differentiating circuit 107 that has differentiated the output signal from the oscillator 106. In other words, a velocity change is detected at fixed intervals. Then, the comparator 104 compares the output from the integrating circuit 101 with a fixed value and generates a start signal when the output exceeds the fixed value.

If the acceleration changes rapidly just before generation of the reset signal, the integrating circuit 101 would be reset during the course of the acceleration change, resulting in no reflection of this change to the output from the integrating circuit 101. That is, there is a possibility that the start signal would not be generated in spite of the situation that the start signal must be generated. To cope with this problem, the comparator 105 is provided to delay a reset timing when the acceleration changes rapidly. The oscillator 106 is of a variable frequency type.

When the output from the integrating circuit 101 exceeds the comparative value V1, the comparator 102 generates a signal to operate the time constant circuit 103. When the output from the time constant circuit 103, i.e., a predictive start level, becomes lower than the output from the integrating circuit 101 after a predetermined time, the comparator 104 generates a start signal. When the output from the integrating circuit 101 exceeds a predetermined predictive level, the output from the comparator 105 becomes low to increase the oscillation cycle of the oscillator 106. As a result, the cycle of generation of the reset pulse to be supplied through the differentiating circuit 107 to the integrating circuit 101 is increased. The predetermined predictive level mentioned above is a level where a rapid change in acceleration is predicted, and it corresponds to the comparative value V2 in the comparator 105.

The increase in generation cycle of the reset pulse results in an increase in period of detection of the velocity change. In accordance therewith, it is necessary to increase the comparative voltage in the comparator 104. Unless the comparative voltage is set higher, the start signal would be generated even upon an instant velocity change. When the acceleration changes rapidly to cause that the output from the integrating circuit 101 exceeds the comparative value V1, a high-level signal is output from the comparator 102 to result in an increase in the output voltage from the time constant circuit 103. Accordingly, the comparative voltage in the comparator 104 is increased. In this manner, even when the acceleration changes rapidly just before generation of the reset signal to the integrating circuit 101, the start signal can be accurately generated.

However, also in case of a head-on collision at medium to high speeds (e.g., about 50 km/h), the above-mentioned function becomes effective. That is, there is a problem that the increase in the comparative voltage in the comparator 104 causes delay of decision of the collision.

SUMMARY OF THE INVENTION

It is accordingly an object of the present invention to provide a start control device which can quickly decide a collision against which a vehicle passenger protecting device must be started.

It is another object of the present invention to provide a start control device which does not respond to an impact against which the vehicle passenger protecting device must not be started, but quickly responds to a collision against which the vehicle passenger protecting device must be started.

According to a first aspect of the present invention, there is provided a start control device for a vehicle passenger protecting device, comprising start level generating means for setting a decision level of start signal generation to a higher level for a predetermined time from a rise timing of an acceleration signal obtained from an acceleration sensor in deciding a collision by using an integral value of the acceleration signal. With this arrangement, in case of the impact against which the vehicle passenger protecting device must not be started, the start signal can be prevented from being generated.

According to a second aspect of the present invention, there is provided a start control device for a vehicle passenger protecting device, comprising subtraction level generating means for generating a subtrahend which is a value to be subtracted from an output from an acceleration sensor and changes with time, in deciding a collision by using an integral value of the acceleration signal. With this arrangement, in case of the collision against which the vehicle passenger protecting device must be started, it can be quickly detected.

According to a third aspect of the present invention, the above-mentioned start control device further comprises delay means for delaying a start timing of operation of the subtraction level generating means. With this arrangement, in case of the impact against which the vehicle passenger protecting device must not be started, the start signal can be prevented from being generated.

According to a fourth aspect of the present invention, there is provided a start control device for a vehicle passenger protecting device, comprising start level generating means for setting a decision level of start signal generation to a higher level for a predetermined time from a rise timing of an acceleration signal obtained from an acceleration sensor, and subtraction level generating means for generating a subtrahend which is a value to be subtracted from the output from the acceleration sensor and changes with time, in deciding a collision by using an integral value of the acceleration signal. With this arrangement, in case of the impact against which the vehicle passenger protecting device must not be started, the start signal can be prevented from being generated, whereas in case of the collision against which the vehicle passenger protecting device must be started, it can be quickly detected.

Other objects and features of the invention will be more fully understood from the following detailed description and appended claims when taken with the accompanying drawings.

BRIEF DESCRIPTION OF THE DRAWINGS

FIG. 4 is a block diagram showing the construction of a start control device employing a microcomputer;

FIG. 8 is a signal waveform chart showing the operation of the start control device according to the first preferred embodiment in the case where an ignition signal is generated;

FIG. 9 is a signal waveform chart showing the operation of the start control device according to the first preferred embodiment in the case where no ignition signal is generated;

FIG. 10 is a block diagram showing the basic construction of a start control device according to a second preferred embodiment of the present invention;

FIG. 15 is a signal waveform chart showing the operation of the start control device according to the second preferred embodiment in the case where an ignition signal is generated;

FIG. 17 is a signal waveform chart showing the operation of the start control device according to the second preferred embodiment in the case where no ignition signal is generated;

FIG. 20 is a signal waveform chart showing the operation of the start control device according to the third preferred embodiment in the case where an ignition signal is generated;

FIG. 21 is a signal waveform chart showing the operation of the start control device according to the third preferred embodiment in the case where no ignition signal is generated;

DETAILED DESCRIPTION OF THE PREFERRED EMBODIMENTS

There will now be described some preferred embodiments of the present invention with reference to the drawings.

Figure 1:
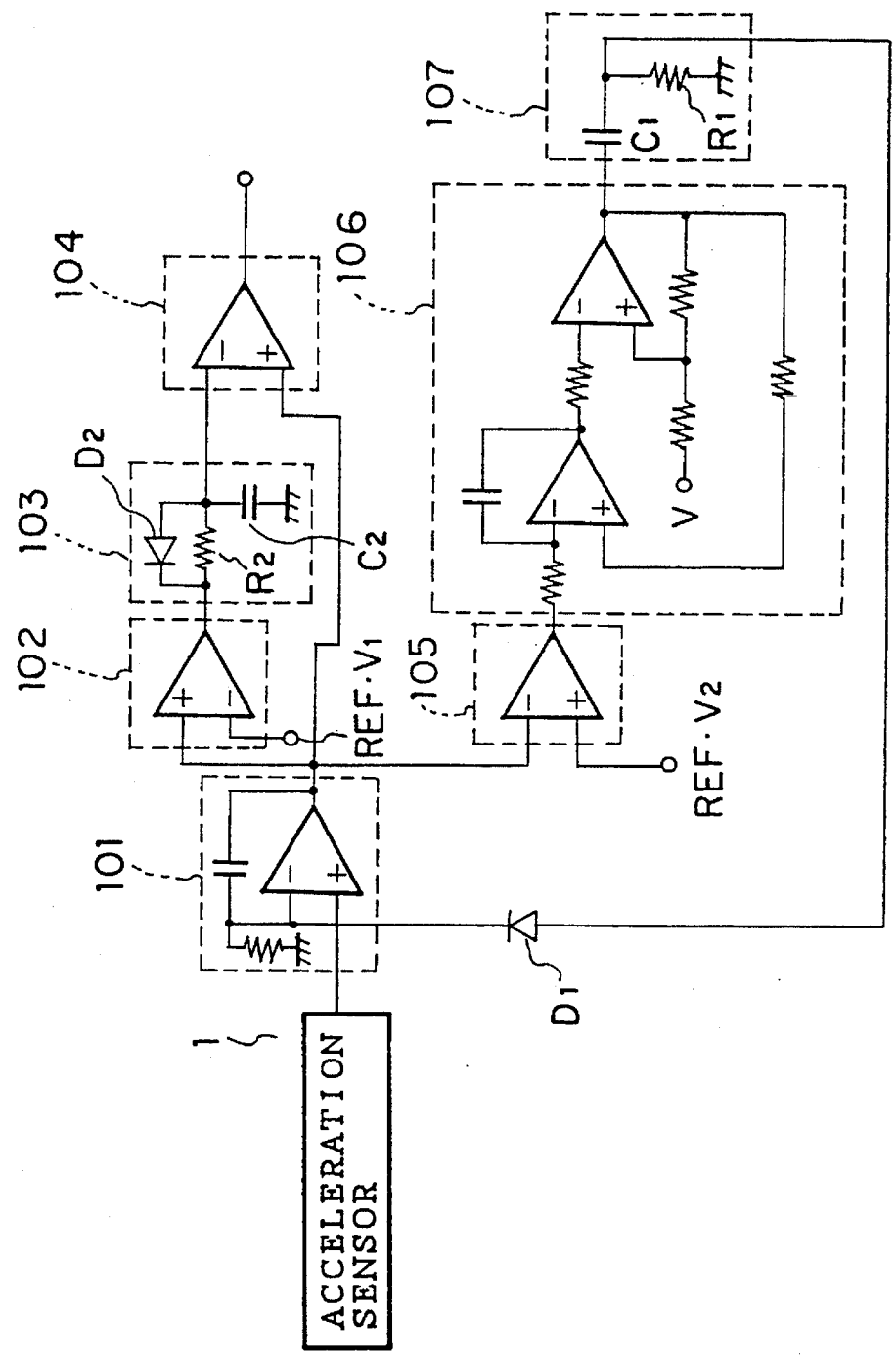
FIG. 1 is a circuit diagram showing a start control device in the prior art.
Figure 2:
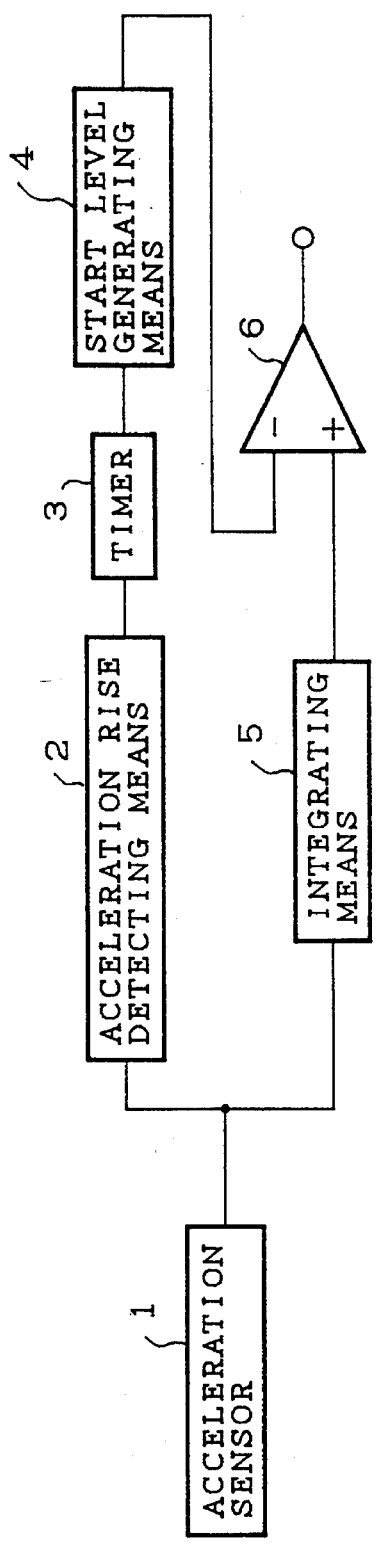
FIG. 2 is a block diagram showing the basic construction of a start control device according to a first preferred embodiment of the present invention.

FIG. 2 is a block diagram showing the basic construction of a start control device according to a first preferred embodiment of the present invention. The start control device shown in FIG. 2 includes an acceleration sensor 1, acceleration rise detecting means 2, timer 3, start level generating means 4, integrating means 5, and comparator 6.

Figure 3:
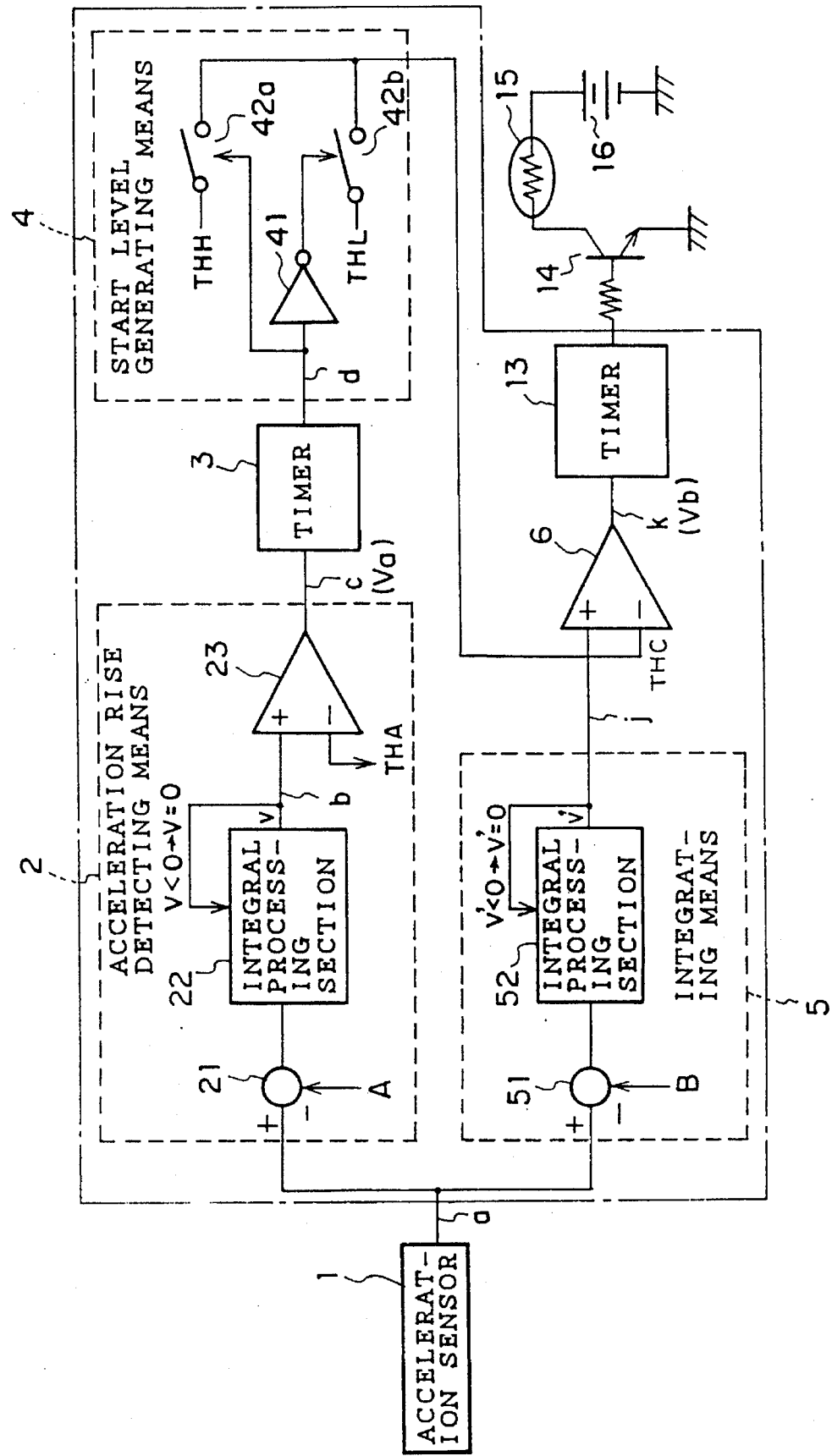
FIG. 3 is a block diagram showing the specific construction of the start control device according to the first preferred embodiment.

FIG. 3 is a block diagram showing the specific construction of the start control device shown in FIG. 2. As shown in FIG. 3, there is provided on the output side of the comparator 6 a timer 13 designed to hold an on-state for a predetermined time when the output from the comparator 6 becomes a high level. Further, there is provided on the output side of the timer 13 a switching transistor 14 designed to go on in receipt of the output from the timer 13, and there are provided on the output side of the transistor 14 a squib 15 as a starting means for a vehicle passenger protecting device and a DC power source 16 connected in series with the squib 15.

The acceleration rise detecting means 2 includes a subtracter 21 for subtracting a fixed value A from the output from the acceleration sensor 1, an integral processing section 22 for integrating the output from the subtracter 21 and having a reset function to initialize an integral value v to zero when it is less than zero, and a comparator 23 for comparing the integral value v with a comparative value THA. Since no resetting at starting of the integration is required, there is no need of providing a trigger circuit. Accordingly, a delay due to the trigger circuit does not occur. The acceleration rise detecting means 2 detects a timing when a signal exceeds a predetermined level. This signal may be either a velocity or an acceleration.

The start level generating means 4 includes an inverter 41 for inverting the output from the timer 3, a switch 42b designed to close and set a comparative value THC in the comparator 6 to THL when the output signal from the inverter 41 is of a high level, and a switch 42a designed to close and set the comparative value THC in the comparator 6 to THH when the output from the timer 3 is of a high level. The comparative value THA is a value determined on the basis of an integral value in an acceleration waveform which is unobtainable in a general collision. Further, the value THL is a value determined on the basis of a maximum of output values from the integrating means 5 upon collision at low speeds (e.g., about 10 km/h). The value THH is a value greater than the value THL.

The integrating means 5 includes a subtracter 51 for subtracting a fixed value B from the output from the acceleration sensor 1, and an integral processing section 52 for integrating the output from the subtracter 51 and having a reset function to initialize an integral value v' to zero when it is less than zero.

While the acceleration rise detecting means 2, the timer 3, the start level generating means 4, the integrating means 5, the comparator 6, and the timer 13 may be realized by hardware, they may be realized by a microcomputer as shown in FIG. 4. Referring to FIG. 4, the microcomputer includes an input interface section 17 for receiving the output from the acceleration sensor 1, a CPU 18, a memory 19 for storing programs and processed data, and an output interface section 20 for supplying an ignition signal to the squib 15.

Figure 6:
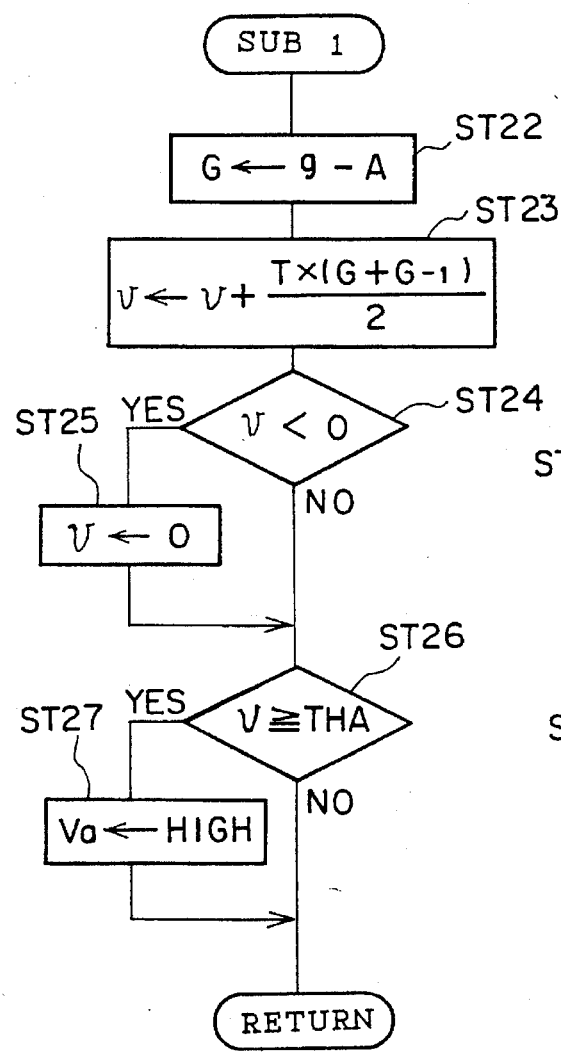
FIG. 6 is a flowchart showing a subroutine in FIG. 5.
Figure 7:
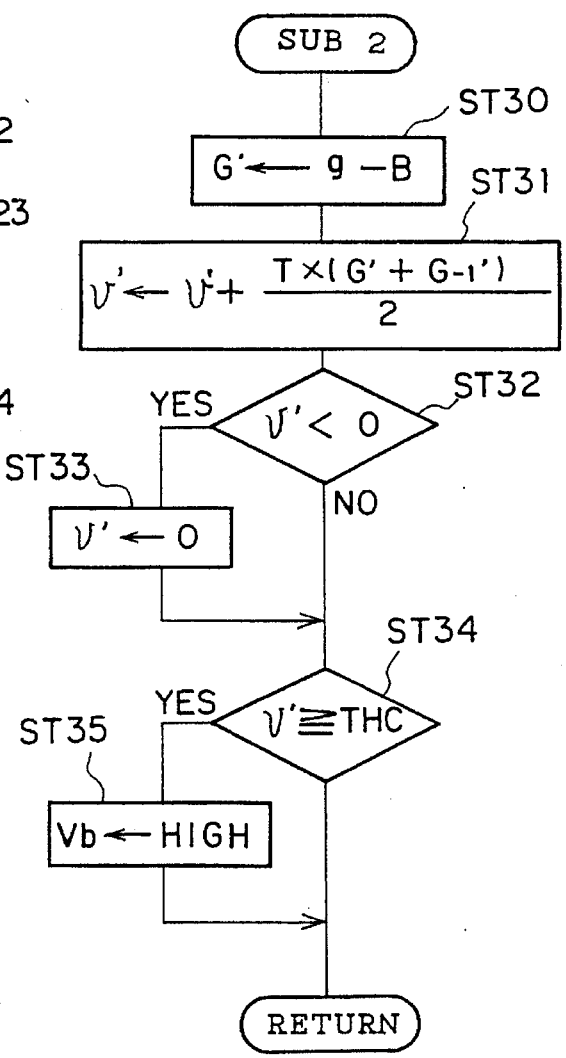
FIG. 7 is a flowchart showing another subroutine in FIG. 5.

The operation of the first preferred embodiment will now be described with reference to the flowcharts shown in FIGS. 5 to 7. When the operation is started, a control section (not shown) sets a sampling time T (step ST2), sets the offset values A and B in the subtracters 21 and 51, respectively (step ST3), and sets the comparative value THA in the comparator 23 (step ST4). The integral processing section 22 initializes an acceleration $G_{-1}$ and an integral value v at a just previous sampling timing to zero, and the integral processing section 52 initializes an acceleration $G'_{-1}$ and an integral value v' at the just previous sampling timing to zero (steps ST5 and ST6). The acceleration rise detecting means 2 and the integrating means 5 input an acceleration signal g from the acceleration sensor 1 at the period T (step ST7). The acceleration rise detecting means 2 executes a subroutine (SUB 1) of step ST8.

In the acceleration rise detecting means 2, the subtracter 21 subtracts the offset value A from the acceleration signal g to obtain an acceleration signal G (step ST22). The integral processing section 22 performs trapezoidal integration of the acceleration signal G to output an integral value v (step ST23). If the integral value v is less than zero, the integral processing section 22 resets the integral value v to zero (steps ST24 and ST25), while if the integral value v is not less than zero, the integral processing section 22 outputs the integral value v without changing it. Then, if the integral value v is greater than the comparative value THA, the comparator 23 sets a signal Va to a high level (steps ST26 and ST27). At this time, when the signal Va rises from a low level to a high level, the timer 3 is started. When the timer 3 is started, it measures a predetermined time. During this predetermined time, the output from the timer 3 remains a high level.

The integral processing section 22 sets the value of the previous acceleration signal $G_{-1}$ to the value of the present acceleration signal G (step ST9). The value of the acceleration signal $G_{-1}$ is stored for the processing at the next sampling timing. When the predetermined time set in the timer 3 has elapsed, the timer 3 stops the measurement of time and changes the output to a low level (steps ST10 and ST11).

In the start level generating means 4, if the output from the timer 3 is of a high level, the switch 42a is closed to output the value THH as the comparative value THC in the comparator 6 (steps ST12 and ST13). If the output from the timer 3 is of a low level, the switch 42b is closed to output the value THL as the comparative value THC in the comparator 6 (step ST12 and ST14).

Then, the integrating means 5 executes a subroutine (SUB 2) of step ST14. The subtracter 51 subtracts the offset value B from the acceleration signal g to obtain an acceleration signal G' (step ST30). The integral processing section 52 performs trapezoidal integration of the acceleration signal G' to output an integral value v' (step ST31). If the integral value v' is less than zero, the integral processing section 52 resets the integral value v' to zero (steps ST32 and ST33), while if the integral value v' is not less than zero, the integral processing section 52 outputs the integral value v' without changing it. Then, if the integral value v' is greater than the comparative value THC, the comparator 6 sets a signal Vb to a high level (steps ST34 and ST35). At this time, when the signal Vb rises from a low level to a high level, the timer 13 is started. When the timer 13 is started, it measures a predetermined time. During this predetermined time, the output from the timer 13 remains a high level.

The integral processing section 52 sets the value of the previous acceleration signal $G'_{-1}$ to the value of the present acceleration signal G' (step ST16). The value of the acceleration signal $G'_{-1}$ is stored for the processing at the next sampling timing. Then, if the signal Vb is of a low level, the program returns to step ST7 (step ST17), while if the signal Vb is of a high level, the elapse of the predetermined time set in the timer 13 is awaited. Thereafter, when the predetermined time has elapsed, the timer 13 stops the measurement of time and changes the output to a low level (steps ST18 and ST19). The high-level output from the timer 13 becomes an ignition signal for starting the squib 15. In this manner, when the integral value v' from the integrating means 5 exceeds the comparative value THC, a pulse having a predetermined width is applied to the transistor 14. Accordingly, a current is supplied to the squib 15 for a given period of time depending upon the pulse width. This given period is a period enough to start the squib 15.

It is to be noted that the above processing has been described on the assumption that the microcomputer as shown in FIG. 4 is used in the start control device. In another case where the acceleration rise detecting means 2, the timer 3, the start level generating means 4, the integrating means 5, the comparator 6, and the timer 13 are realized by hardware, the processing of steps ST8 to ST14 and the processing of steps ST15 to ST19 are executed in parallel.

FIG. 8 is a waveform chart showing the output waveforms from the components of the start control device upon collision of a vehicle at medium to high speeds (e.g., about 50 km/h). In the case of collision at medium to high speeds, the ignition signal must be output. In FIG. 8, (a) shows the output waveform from the acceleration sensor 1 upon collision at medium to high speeds, and (b) shows the output waveform from the integral processing section 22 obtained by subtracting the fixed value A from the output from the acceleration sensor 1 and integrating the difference thus obtained. In FIG. 8, (b) the comparative value THA is a value determined on the basis of an integral value of an acceleration waveform unobtainable in a general collision, e.g., an acceleration waveform due to a hammering impact. In FIG. 8, (c) shows the output waveform from the comparator 23; (d) shows the output waveform from the timer 3; (j) shows the output waveform from the integral processing section 52; and (k) shows the output waveform from the comparator 6.

In the case where the output signal from the acceleration sensor 1 has the waveform shown in (a) of FIG. 8, the output from the integral processing section 22 does not exceed the comparative value THA as shown in (b). Accordingly, the output from the comparator 23 does not become a high level as shown in (c). Accordingly, the timer 3 is not started, and the output from the timer 3 is of a low level as shown in (d). Accordingly, the output from the start level, generating means 4, that is, the comparative value THC in the comparator 6 is fixed to THL.

In this case, the output from the integral processing section 52 exceeds the comparative value THC as shown in (j). Accordingly, the comparator 6 outputs a high-level signal as shown in (k). When the output from the comparator 6 becomes a high level, the timer 13 outputs a high-level signal, or an ignition signal for a predetermined time. The ignition signal from the timer 13 makes the transistor 14 go on, thereby starting the squib 15. As a result, the vehicle passenger protecting device such as an air bag is started to operate.

FIG. 9 is a waveform chart showing the output waveforms from the components of the start control device in case of impact due to hammering or the like. In the case of such impact, the ignition signal must not be output. In FIG. 9, (a) shows the output waveform from the acceleration sensor 1 upon hammering impact; (b) shows the output waveform from the integral processing section 22 obtained by subtracting the fixed value A from the output waveform from the acceleration sensor 1 and integrating the difference thus obtained; (c) shows the output waveform from the comparator 23; (d) shows the output waveform from the timer 3; (j) shows the output waveform from the integral processing section 52; and (k) shows the output waveform from the comparator 6.

As shown in (a) of FIG. 9, an acceleration of a very high level with a short duration is generated by the hammering impact.. In this case, the output from the integral processing section 22 exceeds the comparative value THA as shown in (b). Accordingly, the output from the comparator 23 becomes a high level as shown in (c). Accordingly, the timer 3 is started to output a high-level signal for a predetermined time as shown in (d). During this predetermined time, the start level generating means 4 maintains THH as the comparative value THC in the comparator 6 as shown by a broken line in (j).

In this case, the output from the integral processing section 52 exceeds THL as shown in (j). However, in the time interval where a large acceleration is instantaneously generated, the comparative value THC in the comparator 6 is set to THH as shown in (j). Accordingly, the output from the comparator 6 does not become a high level as shown in (k). Accordingly, the timer 13 is not started, and the output from the timer 13 does not become a high level.

As described above, in the case where an acceleration of a very high level with a short duration is generated by hammering impact or the like, the impact decision level in the comparator 6 becomes high for a predetermined time measured from a rise timing of the acceleration signal, so that no ignition signal is generated.

FIG. 10 is a block diagram showing the basic construction of a start control device according to a second preferred embodiment of the present invention. The start control device shown in FIG. 10 includes an acceleration sensor 1, acceleration rise detecting means 7, timer 8, subtraction level generating means 9, adder 10, integrating means 11, and comparator 6.

Figure 11:
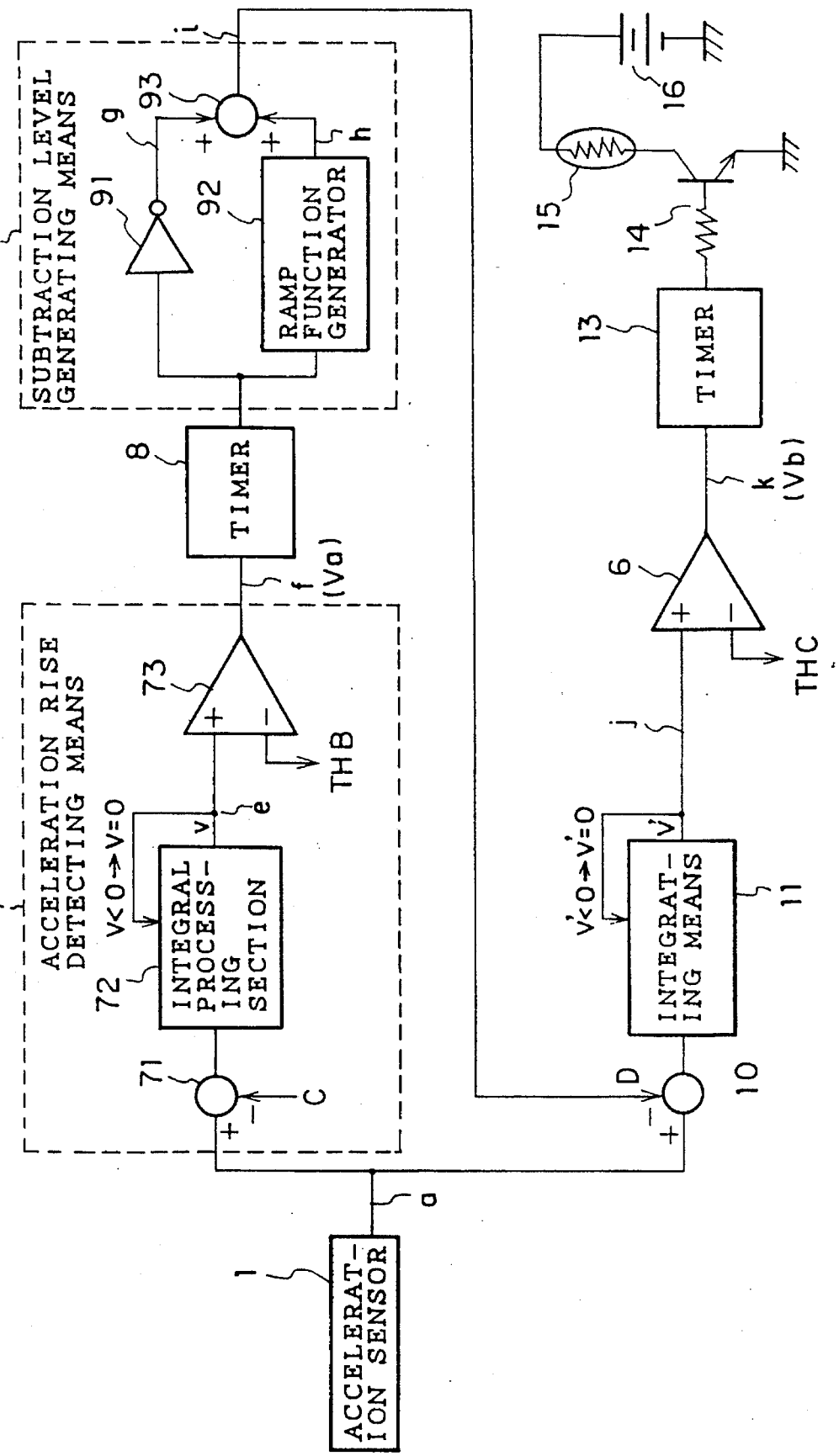
FIG. 11 is a block diagram showing the specific construction of the start control device according to the second preferred embodiment.

FIG. 11 is a block diagram showing the specific construction of the start control device shown in FIG. 10. As shown in FIG. 11, there is provided on the output side of the comparator 6 a timer 13 designed to hold an on-state for a predetermined time when the output from the comparator 6 becomes a high level. Further, there is provided on the output side of the timer 13 a switching transistor 14 designed to go on in receipt of the output from the timer 13, and there are provided on the output side of the transistor 14 a squib 15 as a starting means for a vehicle passenger protecting device and a DC power source 16 connected in series with the squib 15.

The acceleration rise detecting means 7 includes a subtracter 71 for subtracting a fixed value C from the output from the acceleration sensor 1, an integral processing section 72 for integrating the output from the subtracter 71 and having a reset function to initialize an integral value v to zero when it is less than zero, and a comparator 73 for comparing the integral value v with a comparative value THB. The timer 8 is designed to output a high-level signal for a predetermined time when the output from the acceleration rise detecting means 7 rises.

The subtraction level generating means 9 includes an inverter 91 for inverting the output from the timer 8, a ramp function generator 92, and an adder 93 for adding the output from the inverter 91 and the output from the ramp function generator 92. The ramp function generator 92 may be replaced by a quadratic curve generator or a cubic curve generator.

The subtracter 10 is designed to subtract the output from the subtraction level generating means 9 from the output from the acceleration sensor 1. The integrating means 11 is designed to integrate the output from the subtracter 10 and initialize an integral value v' to zero when it is less than zero. The construction of the integrating means 11 may be the same as that of the integral processing section 52 shown in FIG. 3. The comparator 6 is designed to compare the integral value v' with a comparative value THC. The timer 13 is designed to output a high-level signal for a predetermined time when the output from the comparator 6 rises.

The operation of the second preferred embodiment will now be described with reference to the flowcharts shown in FIGS. 12 and 13. When the operation is started, a control section (not shown) sets a sampling time T (step ST41), sets the offset value C in the subtracter 71 (step ST42), and sets the comparative values THB and THC in the comparators 73 and 6, respectively (step ST43). The integral processing section 72 initializes an acceleration $G_{-1}$ and an integral value v at a just previous sampling timing to zero, and the integrating means 11 initializes an acceleration $G'_{-1}$ and an integral value v' at the just previous sampling timing to zero (steps ST44 and ST45). The control section further sets a slope a of a ramp function in the ramp function generator 92 (step ST46), and initializes a time t measured from the start of the ramp function (step ST47).

The acceleration rise detecting means 7 and the subtracter 10 input an acceleration signal g from the acceleration sensor 1 at the period T (step ST48). The acceleration rise detecting means 7 executes a subroutine (SUB 1) of step ST49. This subroutine is the same as that shown in FIG. 6 with the exception that the subject to be integrated is a value G obtained by subtracting the offset value C from the acceleration signal g. When the integral value v exceeds the comparative value THB, the acceleration rise detecting means 7 outputs a high-level signal. When the acceleration rise detecting means 7 outputs a high-level signal, the timer 8 is started.

The integral processing section 72 sets the value of the previous acceleration signal $G_{-1}$ to the value of the present acceleration signal G (step ST50). The value of the acceleration signal $G_{-1}$ is stored for the processing at the next sampling timing. When the predetermined time set in the timer 8 has elapsed, the timer 8 stops the measurement of time and changes the output to a low level (steps ST51 and ST52).

Figure 13:
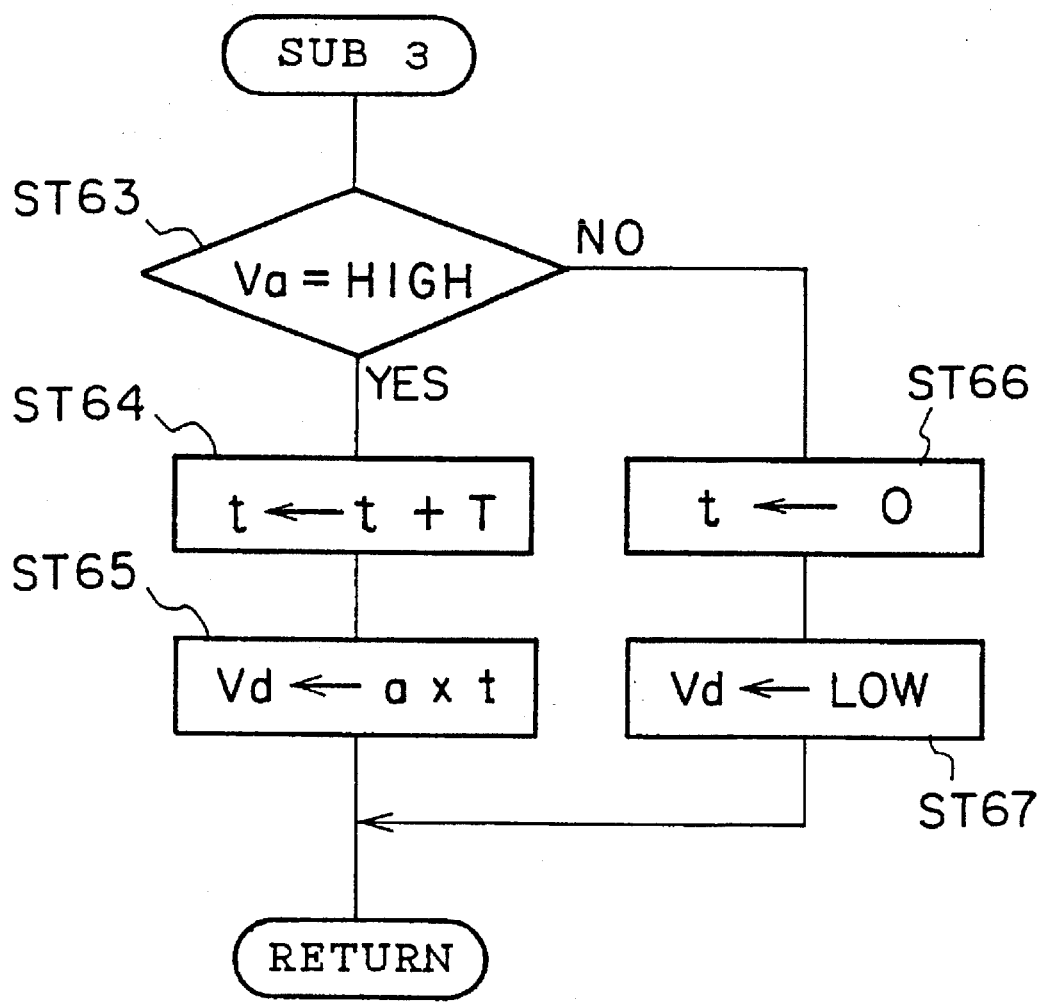
FIG. 13 is a flowchart showing a subroutine in FIG. 12.
Figure 14A:
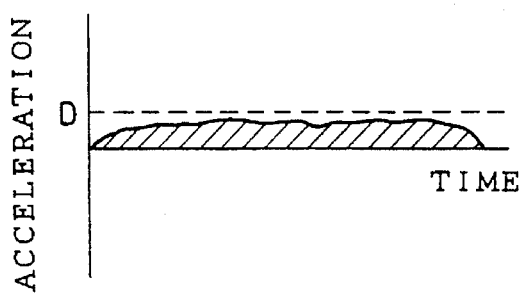
FIG. 14 is a waveform chart for explaining the effect of an offset value.
Figure 14B:
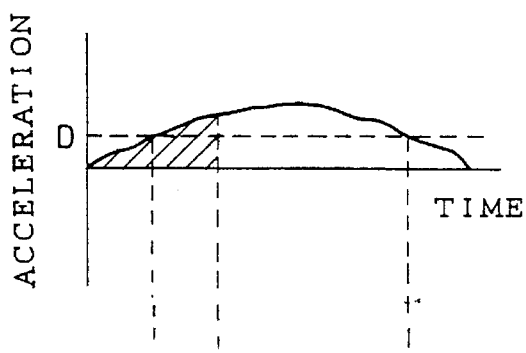
Figure 14C:
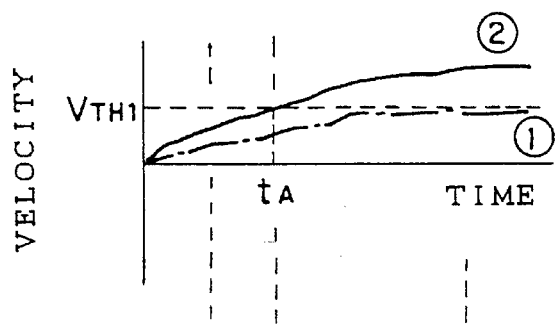
Figure 14D:
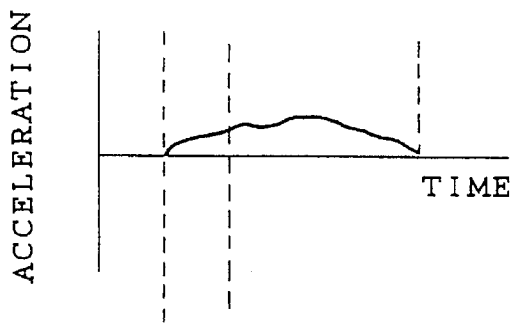
Figure 14E:
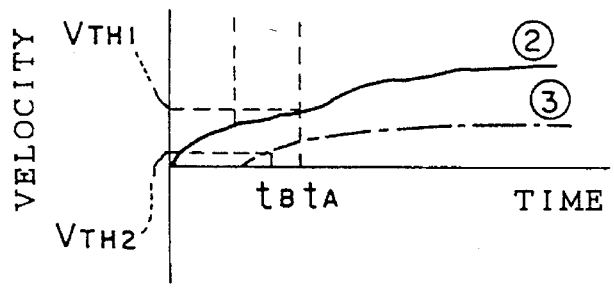

In the subtraction level generating means 9, the inverter 91 inverts the output from the timer 8 to generate a signal Vc (step ST53), and the ramp function generator 92 executes a subroutine (SUB 3) shown in FIG. 13 (step ST54).

Referring to FIG. 13, if the output from the timer 8 is of a high level, the sampling time T is added to the time t measured from the start of the ramp function, and the sum (t+T) is set to the time t at the present timing (steps ST63 and ST64). Then, the slope a of the ramp function is multiplied by the time t to generate a signal Vd (step ST65). If the output from the timer 8 is of a low level, the time t is initialized to zero, and the signal Vd is set to a low level (steps ST66 and ST67). As a result, the signal Vd whose value increases with time is output from the ramp function generator 92 when the output from the timer 8 is of a high level, whereas a low-level signal is output from the ramp function generator 92 when the output from the timer 8 is of a low level.

The adder 93 adds the signal Vc and the signal Vd to generate a subtrahend D to be supplied to the subtracter 10 (step ST55). Then, the subtracter 10, the integrating means 11, and the comparator 6 execute a subroutine (SUB 2) of step ST56. This subroutine is the same as that shown in FIG. 7 with the exception that the subtracter 10 performs the computation of (g - D) in step ST30 to obtain a value G'. The processing by the integrating means 11 is the same as that by the integral processing section 52. The comparator 6 compares the integral value v' from the integrating means 11 and the comparative value THC, and outputs either a high-level signal or a low-level signal as a signal Vb. At this time, when the signal Vb rises from a low level to a high level, the timer 13 is started. When the timer 13 is started, it measures a predetermined time. During this predetermined time, the output from the timer 13 remains a high level.

The integrating means 11 sets the value of the previous acceleration signal $G'_{-1}$ to the value of the present acceleration signal G' (step ST57). The value of the acceleration signal $G'_{-1}$ is stored for the processing at the next sampling timing. Then, if the signal Vb is of a low level, the program returns to step ST48 (step ST58), while if the signal Vb is of a high level, the elapse of the predetermined time set in the timer 13 is awaited. Thereafter, when the predetermined time has elapsed, the timer 13 stops the measurement of time and changes the output to a low level (steps ST59 and ST60). The high-level output from the timer 13 becomes an ignition signal for starting the squib 15. In this manner, when the integral value v' from the integrating means 11 exceeds the comparative value THC, a pulse having a predetermined width is applied to the transistor 14.

The above processing has been described on the assumption that the microcomputer as shown in FIG. 4 is used in the start control device. However, the acceleration rise detecting means 7, the timer 8, the subtraction level generating means 9, the adder 10, the integrating means 11, the comparator 6, and the timer 13 may be realized by hardware.

FIG. 14 illustrates the effect of the subtrahend D. In FIG. 14, (a) shows an acceleration signal waveform upon collision at low speeds (e.g., about 10 km/h), and (b) shows an acceleration signal waveform upon collision at medium to high speeds (e.g., about 50 km/h). Upon collision at low speeds (e.g., about 10 km/h), the ignition signal need not be output. Upon collision at medium to high speeds (e.g., about 50 km/h), the ignition signal must be output. As shown in FIG. 14, (a), the subtrahend D is set to a value greater than a maximum value in the acceleration signal waveform.

In FIG. 14, (c) shows integral waveforms obtained by integrating the acceleration signal waveforms shown in (a) and (b), in which the graph (1) shows the integral waveform obtained by integrating the acceleration signal waveform shown in (a), and the graph (2) shows the integral waveform obtained by integrating the acceleration signal waveform shown in (b). As shown in (c), a threshold $V_{TH1}$ in outputting the ignition signal is set to a value greater than a maximum value in the waveform (1), and $t_A$ denotes a decision time required until the waveform (2) reaches the threshold $V_{TH1}$.

The subtraction of the value D from the acceleration signal waveform shown in (a) results in a negative value of the acceleration signal, whereas the subtraction of the value D from the acceleration signal waveform shown in (b) results in the acceleration signal waveform shown in (d). The integration of the waveform shown in (d) results in the waveform (3) shown in (e). As apparent from (e) of FIG. 14, the presence of the value D results in downward shift of the waveform (2) to the waveform (3). Furthermore, since the integral waveform upon collision at low speeds becomes minus owing to the presence of the value D, the threshold $V_{TH1}$ can be shifted downward. For example, as shown in (e), a threshold $V_{TH2}$ considerably lower than the threshold $V_{TH1}$ can be set. The time $t_B$ denotes a decision time required until the waveform (3) reaches the threshold $V_{TH2}$. It is understood that the decision time $t_B$ required in the presence of the value D is shorter than the decision time $t_A$ required in the absence of the value D. In other words, the presence of the subtraction level generating means 9 brings about the effect that the output timing of the ignition signal can be early detected. The threshold $V_{TH2}$ corresponds to the comparative value THC in the comparator 6.

FIG. 15 is a waveform chart showing the output waveforms from the components of the start control device upon collision at medium to high speeds (e.g., about 50 km/h). In FIG. 15, (a) shows the output waveform from the acceleration sensor 1 upon collision at the medium to high speeds, and (e) shows the output waveform from the integral processing section 72 obtained by subtracting the fixed value C from the output waveform shown in (a) and integrating the difference thus obtained. The comparative value THB is set to a value greater than an integral value of an acceleration waveform due to an impact as in braking at low speeds where no ignition signal is needed. In FIG. 15, (f) shows the output waveform from the comparator 73; (g) shows the output waveform from the inverter 91; (h) shows the output waveform from the ramp function generator 92; (i) shows the output waveform from the adder 93; (j) shows the output waveform from the integrating means 11; and (k) shows the output waveform from the comparator 6.

In the case where the output signal from the acceleration sensor 1 has the waveform as shown in (a), the output from the integral processing section 72 exceeds the comparative value THB as shown in (e). Accordingly, the output from the comparator 73 becomes a high level as shown in (f). Accordingly, the timer 8 is started, and the output from the timer 8 becomes a high level for a predetermined time. Accordingly, the output from the inverter 91 becomes a low level for this predetermined time.

Figure 16:
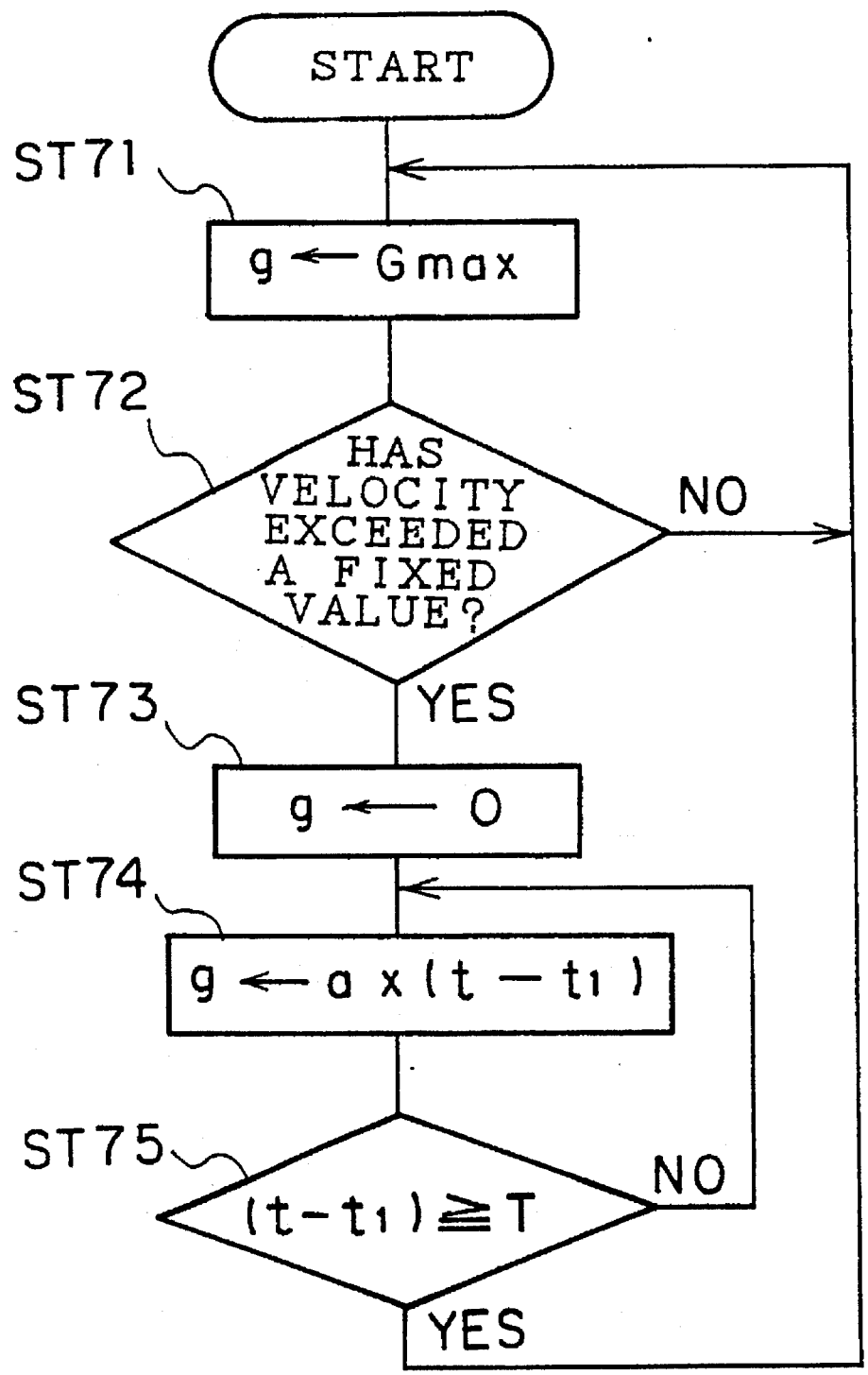
FIG. 16 is a flowchart showing the procedure of creation of a subtraction function.

FIG. 16 is a flowchart illustrating the operation of the adder 93. The output from the adder 93 is kept at a fixed value $G_{max}$ until the velocity (the integral value of the acceleration) exceeds a fixed value, i.e., THB (steps ST71 and ST72). The fixed value $G_{max}$ corresponds to a high level in the inverter 91. At the timing when the integral value of the acceleration exceeds THB, the output from the adder 93 becomes zero (step ST73). The zero output from the adder 93 corresponds to a low level in the inverter 91. Then, the output from the adder 93 increases linearly at the constant rate a (step ST74). This increase is created by the ramp function generator 92 as shown in (h). Thereafter, when the time interval from a time $t_1$ (at which the velocity exceeds the fixed value, i.e., THB) to a time (t - $t_1$) exceeds a fixed value T, the output from the adder 93 becomes $G_{max}$. This fixed value T corresponds to a predetermined time set in the timer 8. Accordingly, the output waveform from the adder 93 is shown as shown in (i). While the flowchart shown in FIG. 16 illustrates the operation of the adder 93, the adder 93 actually adds the output from the inverter 91 and the output from the ramp function generator 92.

In general, a large change appears in the acceleration waveform upon collision at medium to high speeds earlier than in the acceleration waveform upon collision at low speeds (e.g., in the preceding half portion of the waveform with respect to a time $t_h$ shown in FIG. 15). The output waveform from the adder 93 over the time interval T shown in (i) shows a ramp-function change such that the output is small in the preceding half portion of the time interval T and gradually becomes large in the succeeding half portion of the time interval T. Accordingly, the output from the subtraction 10 is substantially the same as the output from the acceleration sensor 1 in the preceding half portion of the time interval T. However, in the succeeding half portion of the time interval T, the output from the subtracter 10 is greatly decreased in value by the subtraction of a large value from the output value from the acceleration sensor 1. In other words, as shown in (j), the output from the integrating means 11 is dependent upon the magnitude of the acceleration in the preceding half portion of the time interval T, resulting in the fact that the characteristic of the acceleration waveform upon collision at medium to high speeds is emphasized.

At the timing when the integral value from the integrating means 11 exceeds the comparative value THC in the comparator 6, the output from the comparator 6 becomes a high level as shown in (k). As a result, the timer 13 is started to output the ignition signal. While there has been described previously with reference to FIG. 14 that the detection time for collision can be reduced by the presence of the subtrahend D, it is now understood that the detection time can be more reduced by increasing the subtrahend D in the form of a ramp function.

FIG. 17 is a waveform chart showing the output waveforms from the components of the start control device upon collision at low speeds (e.g., about 10 km/h). The fixed value C is subtracted from the output from the acceleration sensor 1 shown in (a) of FIG. 17, and the difference thus obtained is integrated in the integral processing section 72 to obtain an integral waveform as shown in (e). At the timing when the output waveform from the integral processing section 72 exceeds the comparative value THB, the output waveform from the comparator 73 becomes a high level as shown in (f). At the same time, the timer 8 is started to output a high-level signal for a predetermined time. The output waveform from the inverter 91 generating an inverted signal of the output from the timer 8 becomes a low level to continue this state until the timer 8 stops the measurement of time as shown in (g). At the same time, the output waveform from the ramp function generator 92 rises and gradually increases over the predetermined time set in the timer 8 as shown in (b). The adder 93 adds the output waveform shown in (g) and the output waveform shown in (h) to generate the output waveform shown in (i).

In this case, the acceleration signal from the acceleration sensor 1 is relatively small in value. Accordingly, the integral value from the integral processing section 72 exceeds the comparative value THB at a relative late timing. Accordingly, the effective subtrahend D from the adder 93 is output during the succeeding half portion of the acceleration generation period. In other words, the succeeding half portion of the acceleration signal is greatly subtracted in the subtracter 10 by the subtrahend D forming the ramp function as shown in (i). As a result, as shown in (j), the peak of the integral value from the integrating means 11 becomes smaller than that in the case where the subtrahend is constant. Accordingly, even when the comparative value THC is set to a small value, no ignition signal is generated upon collision at low speeds. Since the comparative value THC can be set to a small value, the decision time upon collision at medium to high speeds can be reduced to affect quick generation of the ignition signal.

While the subtrahend D is changed in the form of a ramp function in the subtraction level generating means 9 in the second preferred embodiment, the subtrahend D may be changed in the form of a quadratic curve or a cubic curve.

Figure 18:
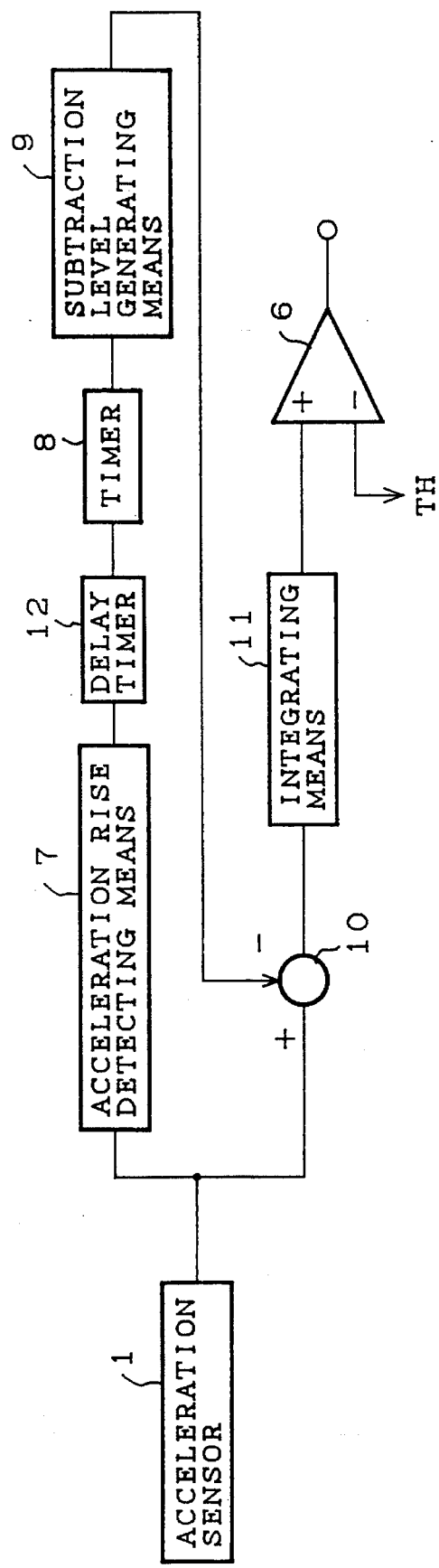
FIG. 18 is a block diagram showing the basic construction of a start control device according to a third preferred embodiment of the present invention.
Figure 19:
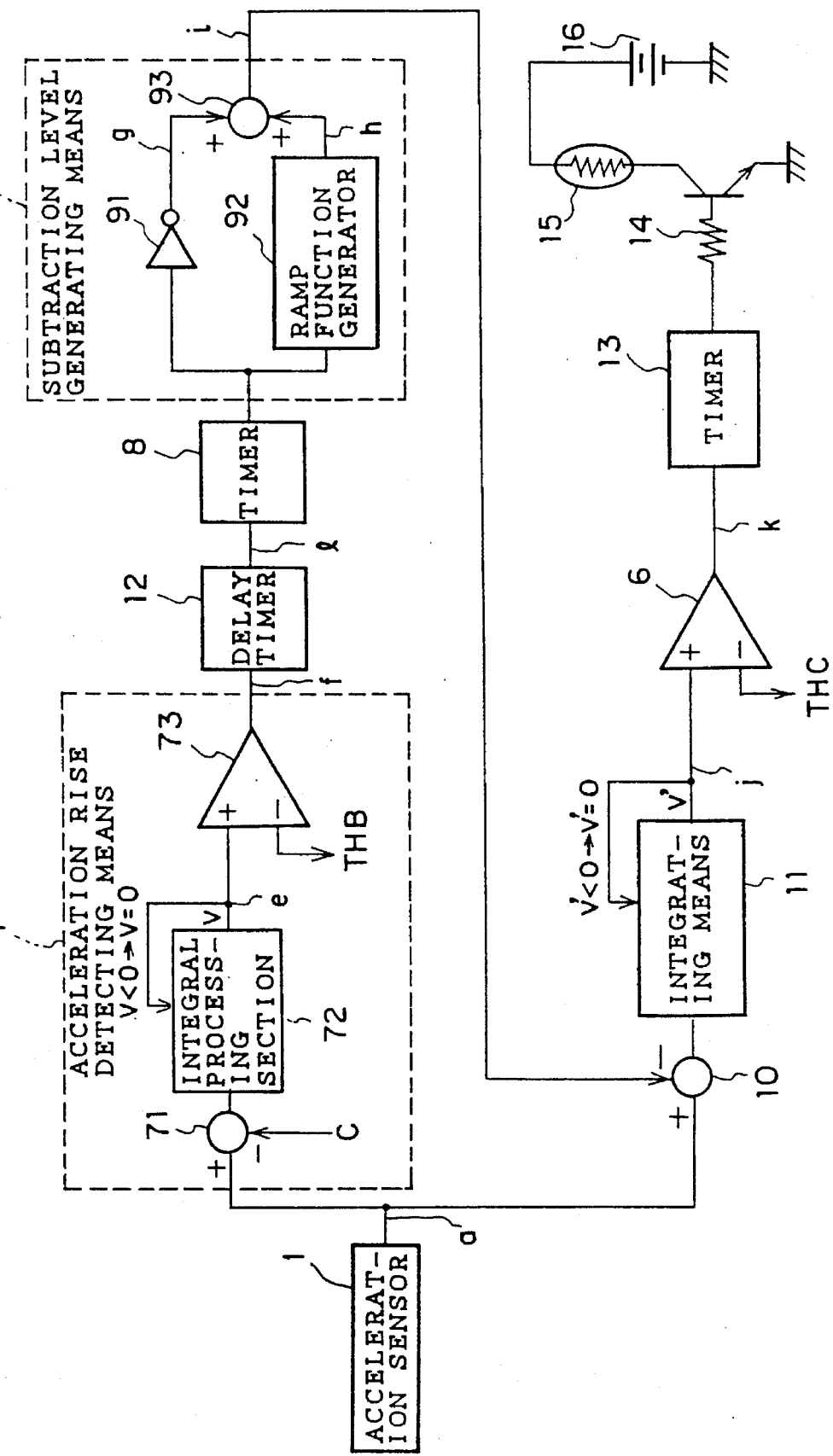
FIG. 19 is a block diagram showing the specific construction of the start control device according to the third preferred embodiment.

FIG. 18 is a block diagram showing the basic construction of a start control device according to a third preferred embodiment of the present invention. The start control device shown in FIG. 18 includes an acceleration sensor 1, acceleration rise detecting means 7, delay timer 12, timer 8, subtraction level generating means 9, adder 10, integrating means 11, and comparator 6. FIG. 19 is a block diagram showing the specific construction of the start control device shown in FIG. 18. The specific construction shown in FIG. 19 is substantially the same as that shown in FIG. 11 with the exception that the delay timer 12 is additionally provided on the previous stage of the timer 8. The delay timer 12 is designed to delay the output from the comparator 73 for a predetermined time.

The operation of the third preferred embodiment will now be described with reference to FIG. 20. In FIG. 20, (a) shows the output waveform from the acceleration sensor 1 upon collision at medium to high speeds (e.g., about 50 km/h) where the ignition signal must be generated; (e) shows the output waveform from the integral processing section 72 obtained by subtracting the fixed value C from the output waveform from the acceleration sensor 1 shown in (a) and integrating the difference thus obtained; (f) shows the output waveform from the comparator 73; (1) shows the output waveform from the delay timer 12; (g) shows the output waveform from the inverter 91; (h) shows the output waveform from the ramp function generator 92; (i) shows the output waveform from the adder 93; (j) shows the output waveform from the integrating means 11; and (k) shows the output waveform from the comparator 6.

When the acceleration as shown in (a) is output from the acceleration sensor 1, the integral value as shown in (e) is output from the integral processing section 72. At the timing when the integral value exceeds the comparative value THB, the output from the comparator 73 becomes a high level as shown in (f). The delay timer 12 delays the output from the comparator 73 and then outputs a high-level signal as shown in (1). At the timing when the output from the delay timer 12 becomes a high level, the timer 8 is started to output a high-level signal for a predetermined time. Accordingly, the output from the inverter 91 for inverting the output from the timer 8 becomes a low level for this predetermined time as shown in (g). During this predetermined time set in the timer 8, the output from the ramp function generator 92 continues to rise as shown in (h). The adder 93 adds the output from the inverter 91 shown in (g) and the output from the ramp function generator 92 shown in (h) to output a signal shown in (i). The output from the adder 93 constitutes the subtrahend in the subtracter 10. Thus, the start timing of the subtraction level generating means 9 is influenced by the set time of the delay timer 12, so that the decision of the collision at medium to high speeds is somewhat delayed as compared with that in the second preferred embodiment.

The effect of the delay timer 12 in case of hammering impact or the like will now be described with reference to FIG. 21. In FIG. 21, (a) shows the output waveform from the acceleration sensor 1 upon hammering. In this case, the ignition signal must not be generated. As shown in (a), the output waveform from the acceleration sensor 1 upon hammering has a short duration and a very large acceleration. Accordingly, as shown in (e), the output waveform from the integral processing section 72 exceeds the comparative value THB at a relatively early timing. That is, as shown in (f), the output from the comparator 73 becomes a high level at a relatively early timing. However, as shown in (1), the output from the comparator 73 is delayed by the delay timer 12. Accordingly, the start timing of the subtraction level generating means 9 is delayed, so that the output from the adder 93 remains a high level in the preceding half portion of the acceleration generation period as shown in (i).

Accordingly, in the preceding half portion where a relatively large acceleration is generated, the subtrahend in the subtracter 10 remains large. That is, the relatively large acceleration is canceled by the subtracter 10, and it is not supplied to the integrating means 11 in the preceding half portion. Accordingly, as shown in (j), over the acceleration generation period even having the relatively large acceleration, the output from the integrating means 11 becomes small so as not to exceed the comparative value THC in the comparator 6. Consequently, as shown in (k), the output from the comparator 6 does not become a high level, and no ignition signal is therefore generated.

Figure 22:
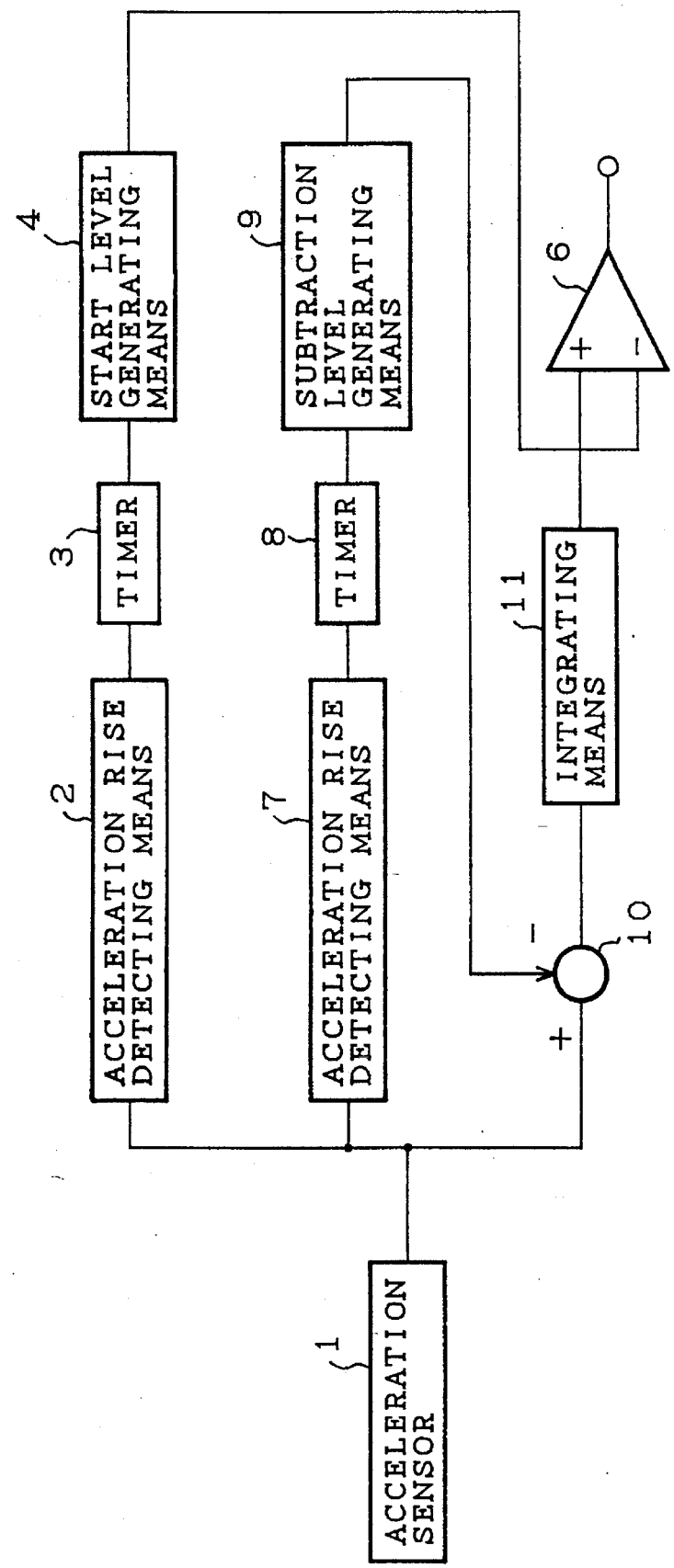
FIG. 22 is a block diagram showing the basic construction of a start control device according to a fourth preferred embodiment of the present invention.

FIG. 22 is a block diagram showing the basic construction of a start control device according to a fourth preferred embodiment of the present invention. The start control device shown in FIG. 22 includes an acceleration sensor 1, acceleration rise detecting means 2, timer 3, start level generating means 4, acceleration rise detecting means 7, timer 8, subtraction level generating means 9, adder 10, integrating means 11, and comparator 6. This construction is the combination of the construction in the first preferred embodiment and the construction in the second preferred embodiment.

Figure 23:
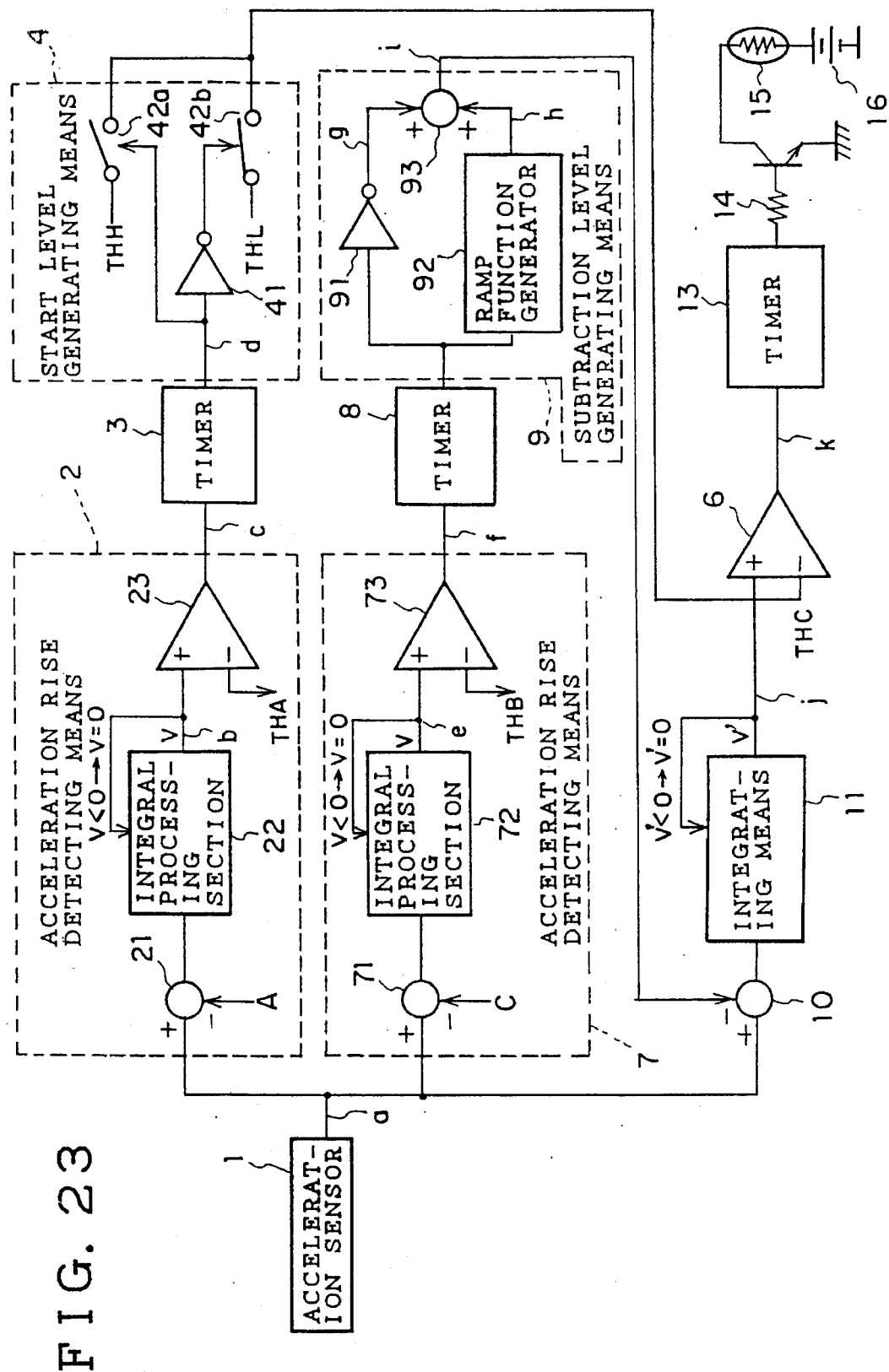
FIG. 23 is a block diagram showing the specific construction of the start control device according to the fourth preferred embodiment.

FIG. 23 is a block diagram showing the specific construction of the start control device shown in FIG. 22. The specific constructions of the acceleration rise detecting means 2, the timer 3, and the start level generating means 4 are the same as those shown in FIG. 3. Further, the specific constructions of the acceleration rise detecting means 7, the timer 8, and the subtraction level generating means 9 are the same as those shown in FIG. 11. Although the single acceleration sensor 1 is connected to the two acceleration rise detecting means 2 and 7 in the construction shown in FIG. 23, two acceleration sensors may be provided and be individually connected to the two acceleration rise detecting means 2 and 7.

In the third preferred embodiment mentioned previously, the delay timer 12 is used to prevent the ignition signal from being generated upon hammering. Accordingly, in detecting a collision at medium to high speeds, the decision timing for the collision is delayed for a predetermined time set in the delay timer 12. To cope with this delay, the fourth preferred embodiment employs both the technique of preventing the generation of the ignition signal upon hammering according to the first preferred embodiment and the technique of hastening the decision of a collision according to the second preferred embodiment. With such a combined construction, the generation of the ignition signal can be prevented upon hammering, and the decision of a collision can be quickly made.

Figure 12:
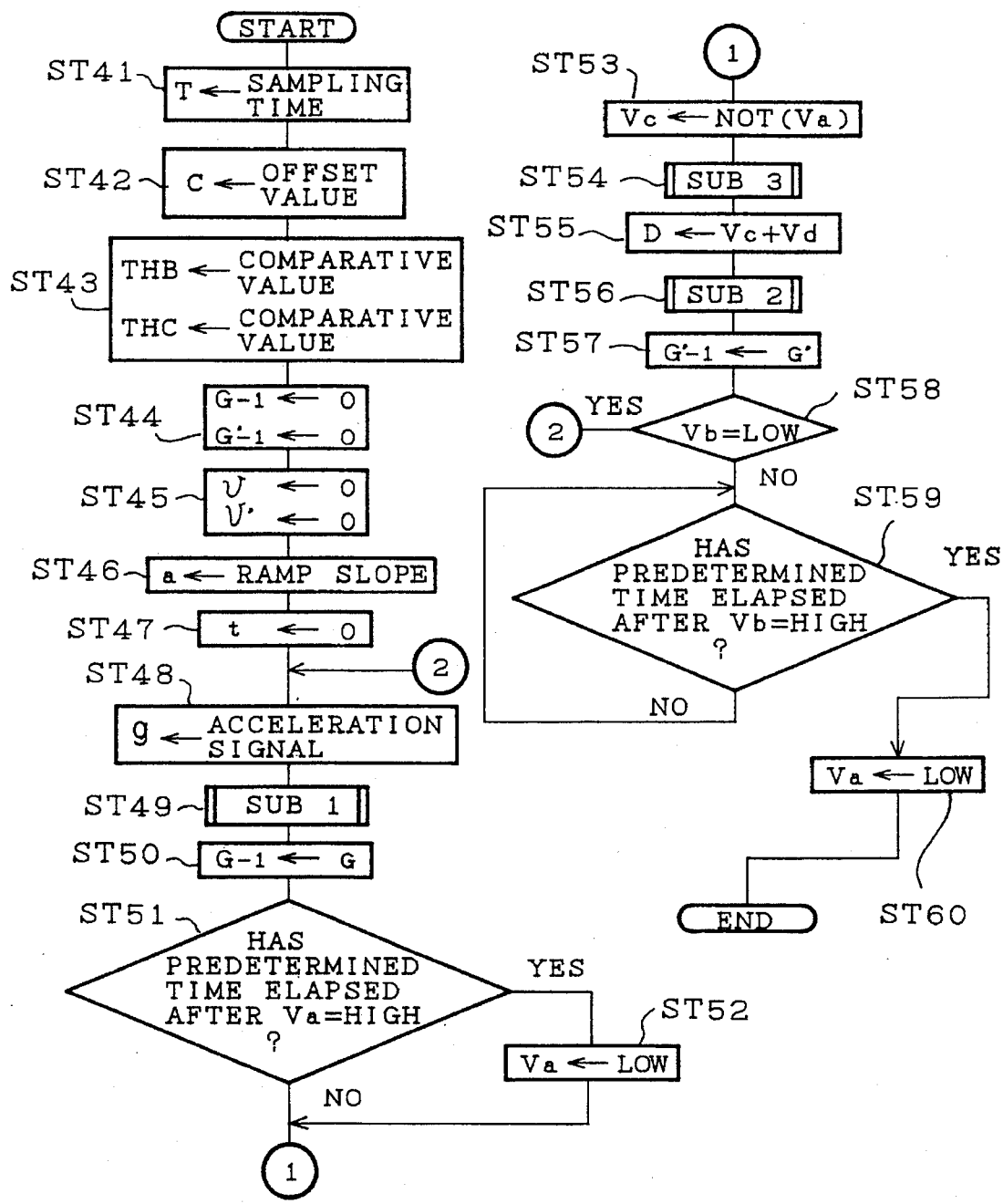
FIG. 12 is a flowchart showing the operation of the start control device according to the second preferred embodiment.

In operation, the acceleration rise detecting means 7, the timer 8, the subtraction level generating means 9, the adder 10, and the integrating means 11 execute the processing of steps ST41 to ST57 in the flowchart of FIG. 12. Accordingly, the integrating means 11 outputs a signal as shown in (j) of FIG. 15 or (j) of FIG. 17, for example.

Figure 5:
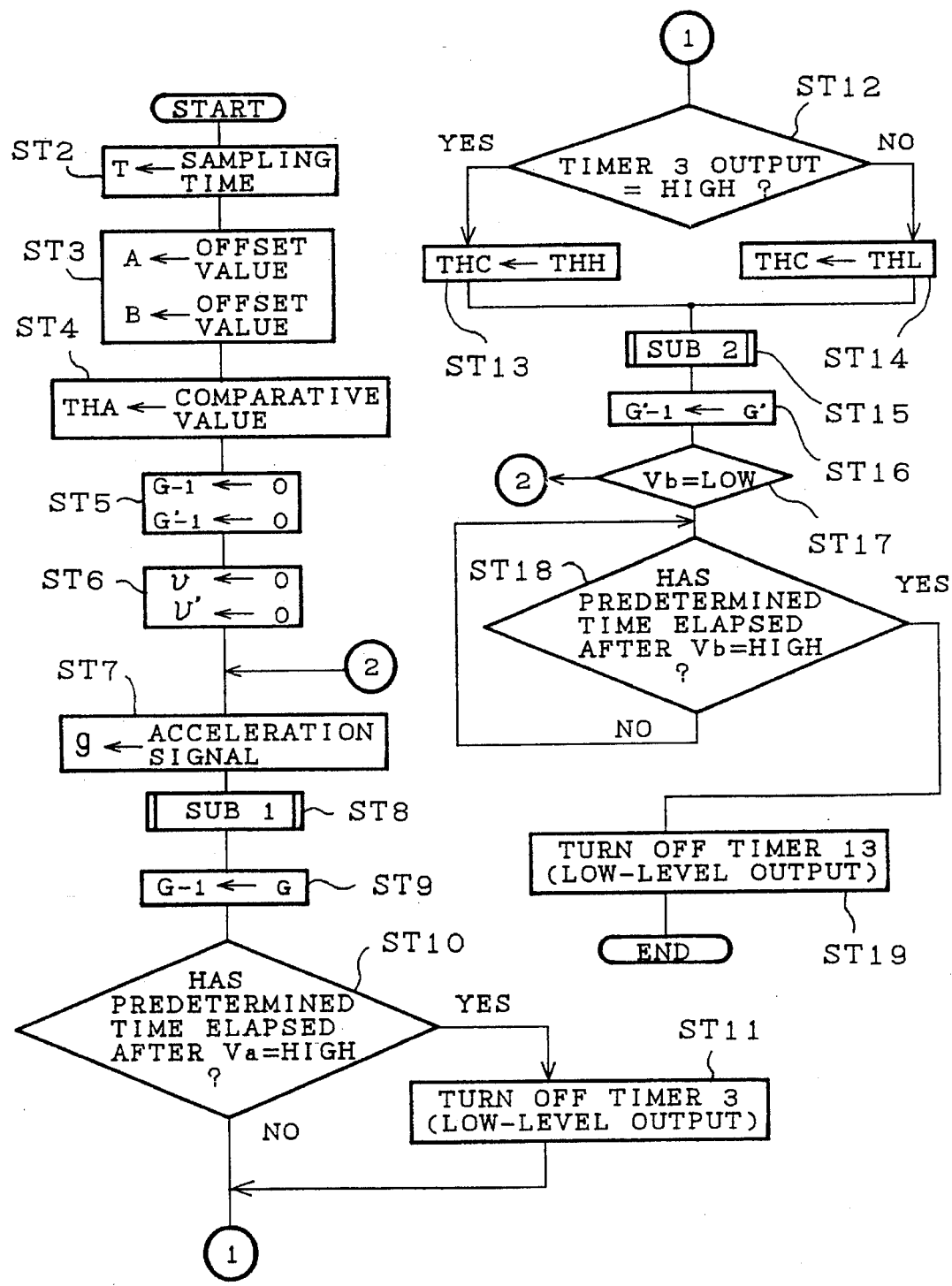
FIG. 5 is a flowchart showing the operation of the start control device according to the first preferred embodiment.

On the other hand, the acceleration rise detecting means 2, the timer 3, and the start level generating means 4 execute the processing of steps ST2 to ST14 in the flowchart of FIG. 5. Accordingly, the start level generating means 4 outputs a value as shown by the broken line in (j) of FIG. 8 or a value as shown by the broken line in (j) of FIG. 9 as the comparative value THC in the comparator 6.

The comparator 6 compares the comparative value THC and the output from the integrating means 11. If the output from the integrating means 11 exceeds the comparative value THC, the timer 13 is started. Accordingly, the ignition signal is generated. In case of a collision at low speeds, the maximum of the output from the integrating means 11 is small. Accordingly, the output from the integrating means 11 does not exceed the comparative value THC, and no ignition signal is therefore generated. Further, in case of hammering, the start level generating means 4 outputs THH as the comparative value THC. Accordingly, also in this case, the output from the integrating means 11 does not exceed the comparative value THC.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A start control device for a vehicle passenger protecting device, comprising:

an acceleration sensor for detecting an acceleration;

integrating means for integrating an output from said acceleration sensor, said integrating means including an integral processing section having a reset function, for initializing an integral value;

comparing means for generating a start signal to said vehicle passenger protecting device when the integral value from said integrating means exceeds a comparative constant value;

acceleration rise detecting means for detecting a rise of said acceleration according to said output from said acceleration sensor; and start level generating means for setting said comparative constant value to a higher value for a predetermined time when said rise of said acceleration is detected by said acceleration rise detecting means.

2. The start control device as defined in claim 1, wherein said comparing means includes a timer adapted to become active for a predetermined time.

3. A start control device for a vehicle passenger protecting device, comprising:

an acceleration sensor for detecting an acceleration;

subtracting means for subtracting a subtrahend from an output from said acceleration sensor;

integrating means for integrating an output from said subtracting means, said integrating means including an integral processing section having a reset function, for initializing an integral value;

comparing means for generating a start signal to said vehicle passenger protecting device when the integral value from said integrating means exceeds a comparative value;

acceleration rise detecting means for detecting a rise of said acceleration according to said output from said acceleration sensor; and subtraction level generating means for setting said subtrahend to change as a function of time for a predetermined time when said rise of said acceleration is detected by said acceleration rise detecting means and for setting said subtrahend to a constant at other times.

4. The start control device as defined in claim 3, wherein said comparing means includes a timer adapted to become active for a predetermined time.

5. The start control device as defined in claim 3, wherein said subtraction level generating means includes, a ramp function generator for generating a ramp function linearly increasing in value with time.

6. The start control device as defined in claim 3, wherein said acceleration rise detecting means outputs a rise detection signal, and said subtraction level generating means responds to receipt of said rise detection signal; and, wherein the start control device further comprises delay means for delaying delivery of said rise detection signal from said acceleration rise detection means to said subtraction level generating means.

7. The start control device as defined in claim 6, wherein said comparing means includes a timer adapted to become active for a predetermined time.

8. The start control device as defined in claim 6, wherein said subtraction level generating means includes a ramp function generator for generating a ramp function linearly increasing in value with time.

9. A start control device for a vehicle passenger protecting device, comprising:

an acceleration sensor for detecting an acceleration;

subtracting means for subtracting a subtrahend from an output from said acceleration sensor;

integrating means for integrating an output from said subtracting means, said integrating means including an integral processing section having a reset function, for initializing an integral value;

comparing means for generating a start signal to said vehicle passenger protecting device when the integral value from said integrating means exceeds a comparative constant value;

first acceleration rise detecting means for detecting a rise of said acceleration according to said output from said acceleration sensor;

start level generating means for setting said comparative constant value to a higher value for a predetermined time when said rise of said acceleration is detected by said first acceleration rise detecting means;

second acceleration rise detecting means for detecting said rise of said acceleration according to said output from said acceleration sensor; and subtraction level generating means for setting said subtrahend to vary as a function of time for a predetermined time when said rise of said acceleration is detected by said second acceleration rise detecting means and for setting said subtrahend to a constant at other times.

10. The start control device as defined in claim 9, wherein said comparing means includes a timer adapted to become active for a predetermined time.

11. The start control device as defined in claim 9, wherein said subtraction level generating means includes a ramp function generator for generating a ramp function linearly increasing in value with time.

12. The start control device of claim 1, wherein said acceleration rise detecting means includes:

second integrating means for integrating an output from said acceleration sensor; and second comparing means for indicating when a value output from said second integrating means is above a second comparative value; and wherein and said start level generating means sets said comparative value to a higher value for a predetermined time when said comparing means indicates said value output from said second integrating means is above said second comparative value.

13. A method of activating a vehicle safety device comprising the steps of:

(a) outputting a detected acceleration signal;

(b) integrating the detected acceleration signal, previously offset by a first value, and outputting a first integration;

(c) subtracting a first threshold value from the first integration to generate a first difference;

(d) generating a subtrahend by outputting a second predetermined threshold value if the first difference of said step (c) has not become positive, and generating the subtrahend by outputting a third predetermined threshold value for a predetermined time period if the first difference generated in step (c) has become positive;

(e) integrating the detected acceleration signal, previously offset by a second value, and outputting a second integration;

(f) subtracting the subtrahend generated in step (d) from the second integration generated in step (e) and outputting a second difference;

(g) activating a vehicle safety device if the second difference is positive.

14. The method of claim 13, wherein step (d) includes generating a subtrahend by outputting a third predetermined threshold value for a fixed period of time if it is determined the first difference has become positive.

15. The method of claim 14, wherein step (g) includes activating an airbag.

16. A method of activating a vehicle safety device comprising the steps of:

(a) determining whether or not a rise in acceleration of the vehicle has reached a first threshold;

(b) providing a constant subtrahend when it is determined in step (a) that the rise in acceleration has not reached the first threshold;

(c) providing a varying subtrahend for a predetermined length of time when it is determined in step (a) that a rise in acceleration has reached the first threshold;

(d) integrating an acceleration value offset by the subtrahend provided by either of step (b) or step (c), thereby creating a first integration value; and (e) activating the safety device if the first integration value in step (d) is greater than a second threshold.

17. The method of claim 16, wherein step (c) includes providing a subtrahend which increases linearly as a function of time for a predetermined length of time.

18. The method of claim 17, wherein the constant subtrahend provided in step (b) is greater than the varying subtrahend provided in step (c) at any time.

19. The method of claim 18, wherein step (a) includes the substeps of:

(a1) subtracting a second constant from an acceleration signal, to create a difference;

(a2) integrating the difference created in substep (a1) to provide a second integration value; and (a3) comparing the second integration value with a value representing the first threshold to thereby determine whether or not a rise in acceleration of the vehicle has reached the first threshold.

20. The method of claim 19, wherein step (c) includes the substeps of:

(c1) activating a first timer when the second integration value exceeds the value representing the first threshold as determined in step (a3); and (c2) generating a ramp function signal when the first timer is activated in step (c1).

21. The method of claim 20, wherein sub-step (c1) of step (c) includes:

delaying the activation of the first timer with a second timer.

22. The method of claim 21, wherein said second threshold of step (e) is a constant value.

23. The method of claim 16, wherein said second threshold of step (e) is a constant value.

24. The method of claim 16, wherein step (e) includes the substeps of:

(e1) integrating an acceleration value, offset by a constant to thus provide a second integration value;

(e2) subtracting a first constant value from the second integration value to generate a first difference;

(e3) generating a the second threshold by outputting a third constant threshold if the first difference of said step (c) has not become positive and generating the second threshold by outputting a fourth constant threshold if the first difference generated in step (c) has become positive.

* * * * *